US012335283B2

(12) United States Patent
Whalen et al.

(10) Patent No.: US 12,335,283 B2
(45) Date of Patent: Jun. 17, 2025

(54) SYSTEMS, METHODS, AND GRAPHICAL USER INTERFACES FOR ACCELERATING A CONSTRUCTION OF A DATA INTEGRATION FOR A NON-INTEGRATED TECHNOLOGY DATA SOURCE

(71) Applicant: Expel, Inc., Herndon, VA (US)

(72) Inventors: Dan Whalen, Herndon, VA (US); Patrick Edgett, Denver, CO (US); Issa Hafiri, Toronto (CA); Ashwin Ramesh, Washington, DC (US); Andrew Pritchett, Dallas, TX (US); Sam Chiou, Washington, DC (US); Joseph Rodriguez, Denver, CO (US); Dave Walk, Philadelphia, PA (US); Max Timmons, Las Vegas, NV (US); Matt Dean, Kansas City, MO (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/749,222

(22) Filed: Jun. 20, 2024

(65) Prior Publication Data
US 2024/0430276 A1    Dec. 26, 2024

Related U.S. Application Data

(60) Provisional application No. 63/521,968, filed on Jun. 20, 2023.

(51) Int. Cl.
*H04L 9/40* (2022.01)
*G06F 8/34* (2018.01)
*H04L 41/22* (2022.01)

(52) U.S. Cl.
CPC ............ *H04L 63/1416* (2013.01); *G06F 8/34* (2013.01); *H04L 41/22* (2013.01); *H04L 63/1433* (2013.01)

(58) Field of Classification Search
CPC . H04L 63/1416; H04L 41/22; H04L 63/1433; H04L 63/10; H04L 63/00; G06F 8/34
(Continued)

(56) References Cited

U.S. PATENT DOCUMENTS 10,454,963 B1 * 10/2019 Smith .................. G06F 16/2477
10,986,117 B1 *  4/2021 Agbabian ........... G06F 21/6218
(Continued)

*Primary Examiner* — Bradley A Teets
*Assistant Examiner* — Zengpu Wei
(74) *Attorney, Agent, or Firm* — Padowithz Alce; Alce PLLC

(57) ABSTRACT

A system, method, and computer-program product includes displaying, via a data integration building user interface, a plurality of integration-identifying user interface input elements configured to receive one or more strings of text for specifying a set of integration identification parameters that characterize an in-development security integration for a third-party security service, displaying, via the data integration building user interface, a signal-specific data mapping container based on receiving an input selecting a signal mapping addition control button of the data integration building user interface, displaying, via the data integration building user interface, a raw event simulation container based on receiving an input selecting a simulation addition control button of the data integration building user interface, and displaying, via the data integration building user interface, an integration deployment control element that, when operated, transitions the in-development security integration to a deployed security integration.

16 Claims, 33 Drawing Sheets

(58) Field of Classification Search
USPC .......................................................... 717/105
See application file for complete search history.

(56) References Cited

U.S. PATENT DOCUMENTS

2018/0198788 A1\* 7/2018 Helen ................. H04L 12/2827
2022/0116356 A1\* 4/2022 Baum .................... G08B 25/08

\* cited by examiner

200

| Identifying a Non-Integrated Technology Data Source | — S205 |

| Obtaining a Corpus of Raw Event Data associated with the Non-Integrated Technology Data Source | — S210 |

| Instantiating a Technology Integration User Interface | — S220 |

| Constructing and Simulating a Data Integration for the Non-Integrated Technology Data Source using the Technology Integration User Interface | — S230 |

| Deploying the Data Integration | — S240 |

FIGURE 2 expel  Refractor  Alert Taxonomy ▾  Signal From Anywhere ▾  Legacy Engine ▾   Logout Signal From Anywhere / Integrations

Integrations

Filter integrations....                                                    [+]

| Name ⊕ | Last Touched By | Last Deployed | |
|---|---|---|---|
| Active Directory | | -- | edit |
| Apex One | | -- | edit |
| Armis | | -- | edit |
| Auth0 | | -- | edit |
| Avi Vantage | | -- | edit |
| Blowhorn Playground | | -- | edit |
| Check Point | | -- | edit |
| Cisco ASA | | -- | edit |
| Cisco Umbrella | | -- | edit |
| Cloudflare | | -- | edit |
| CrowdStrike | | -- | edit |
| Extrahop | | -- | edit |
| Github | | -- | edit |
| Gitlab | | -- | edit |
| Google Chronicle (Spotify AB) | | -- | edit |
| Google Workspace Alert Center | | -- | edit |
| Intune | | -- | edit |
| Jamf Protect | | -- | edit |
| Kubernetes | | -- | edit |

2. 282d7276
deployed 10/3/2022

1. 09c7d061
deployed 8/1/2022

- Tests
- Log Parsers
- Signals
  - Kubernetes Control Plane Event

Kubernetes (AKS)
The name of the integration (e.g. "Symantec Endpoint Protection")
Description
Kubernetes control-plane logs from Azure's Managed Kubernetes Service
Describe this integration
Tests
First, find some example device events that should trigger a signal.

| Name | |
|---|---|
| Base Event Test | |
| Expected Signals | |
| Kubernetes Control Plane Event - x | |
| Log | |

```
{"metadata":
"time": "2023-04-05T14:21:17 171271937"
"category": "
"resourceId": "
"tenantId": "
"subscriptionId": "
"resourceGroup": "
"clusterName": "
"storageAccountName
{"message":
"Kind": "Event"
"apiVersion":
"level": "Requ
"auditID": "339
"stage": "Resp
"requestURI": "
"verb": "list"
"user":
```

Confirm sensitive data has been scrubbed prior to saving an integration

Tests (4/4 passing) ○ ○ ○ ○

| ◁ Tests | ▽ Log Parsers |
| --- | --- |
| ▽ Log Parsers | Log Parsers are used when the signal arrives text instead of JSON Optional |
| ⊛ Signals | ⊛ Signals |
| −Kubernetes Control Plane Event | Identify specific signal types (such as login events, malware activity, network scanning, etc) to be evaluated against "common" (link to commomn detections here) detections |

Signal Type: Kubernetes Control Plane Event
Description: Enter description
Describe the signal
☑ Acceptance Testing
"Acceptance Testing" will cause any alerts originating from the signal to do so at "TESTING" severity
Required Evidence
These types of evidence are required for the signal type

| jmespath | message.requestReceivedTimestamp | | Event Time |
| --- | --- | --- | --- |
| +add a path | | | |
| jmespath | message.sourceIPs | source | IP Address |
| +add a path | | | |
| jmespath | message.user.username | source | Username |
| +add a path | | | |
| jmespath | message.annotations."authorization.k8s.io/decision" | | Action |
| +add a path | | | |

| exactly | literal | allow | | ALLOW |
| --- | --- | --- | --- | --- |
| exactly | literal | deny | | BLOCK |
| exactly | literal | forbid | | BLOCK |
| +add a mapper | | | | |

Tests (4/4 passing) ○ ○ ○ ○

FIGURE 4D

FIGURE 4E expel Refractor  Alert Taxonomy ▾  Signal From Anywhere ▾  Legacy Engine ▾                                                   [Logout]

Signal From Anywhere / Signal Types
Common Signals

| slug | description | |
|---|---|---|
| ANOMALY_DUET | This signal type describes an anomaly event within a vendor device and evaluates them against configured DUETs. | edit |
| AUTHENTICATION_EVENT | give me a description please | edit |
| blowhorn_incident | this is patrick lol | edit |
| BREAK_GLASS_EVENT | Signal checks if a break glass account or resource was accessed | edit |
| BRUTE_FORCE | Signal tracks brute force like events, which includes password spraying. | edit |
| FILE_EVENT | An event based on file activity (read, write, delete, etc) | edit |
| MFA_EVENT | This signal is designed to handle MFA specific events | edit |
| MFA_TIMED_OUT | This signal tracks MFA timed out events | edit |
| NETWORK_ANALYTICAL_EVENT | give me a description please | edit |
| NETWORK_CATEGORICAL_THREAT | give me a description please | edit |
| NETWORK_CONNECTION_EVENT | give me a description please | edit |
| PHISHING_EVENT | Signal indicating a phishing attack is suspected, has been reported, or has occurred | edit |
| POLICY_VIOLATION | A signal type used to define policy violation events from a security device | edit |
| PROCESS_EVENT | An event based on process state (started, stopped, etc) | edit |
| raw_investigative_action | This is a signal type to normalize data to be so it can be retrieved using investigative actions. | edit |
| RISKY_CONFIGURATION_CHANGE | This signal type describes a risky configuration within a vendor device. | edit |
| RISKY_CONFIGURATION_CHANGE_DUET | This signal type describes a risky configuration within a vendor device and evaluates them against configured DUETs. | edit |
| SIEM_EVENT | Common detection for SIEM events | edit |
| SLACK_ANOMALY_EVENTS | Slack Unexpected User Behavior DEPRECATED | edit |
| THREAT_INTEL_EVENT | Signal that contains threat warnings provided by a third party, such as a warning about an attack by a nation-state actor | edit |
| VENDOR_ALERT | This signal type describes security alerts only from a vendor security device. The detection logic for this signal type will be focused on the vendor severity.. | edit |

FIGURE 4F expel  Refractor  Alert Taxonomy ▾  Signal From Anywhere ▾  Legacy Engine ▾   Logout Signal From Anywhere / Signal Types / PROCESS_EVENT Edit Signal Type
Slug
PROCESS_EVENT
Slug is how this signal type will be referenced by integrations and detections (e.g. 'AUTHENTICATION_EVENT')
Description
An event based on process state (started, stopped, etc)
Evidence Required Evidence
Evidence that must be extracted for the signal type

| Event Time |
| Process Name |
| Process Args |
| Asset Name |
| Run As Username |

Recommended Evidence
Evidence that can optionally be extracted for the signal type

| Rule Name |
| Process Name | parent

FIGURE 5 expel  Refractor  Alert Taxonomy ▾  Signal From Anywhere ▾  Legacy Engine ▾                                        Logout Signal From Anywhere / Signal Types / AUTHENTICATION_EVENT Edit Signal Type
Slug
AUTHENTICATION_EVENT
Slug is how this signal type will be referenced by integrations and detections (e.g. 'AUTHENTICATION_EVENT')
Description
give me a description please Evidence Required Evidence
Evidence that must be extracted for the signal type

| . | Event Time |
| source | IP Address |
| source | Username |
| . | Action |
| destination | Resource Name |

Recommended Evidence
Evidence that can optionally be extracted for the signal type

| destination | IP Address |
| destination | URL |

FIGURE 6

FIGURE 8 expel Refractor Alert Taxonomy ▾ Signal From Anywhere ▾ Legacy Engine ▾

Signal From Anywhere / Integrations / Kubernetes / Normalizers / Kubernetes (AKS) / 6123a781

Signals     Detections     Extensions     Settings     Logout

Normalizers

Create a new version 4. 6123a781
deployed 4/5/2023

3. 4aa7bb8e
deployed 4/5/2023

2. 282d7276
deployed 10/3/2022

1. 09c7d061
deployed 8/1/2022

Logic   Conversation   Compare   Explore

Filter
Search Term
search Term
Security Device GUID
security device guid
Attribute Filters[+]
🔍

200 Sample Events

Fields Breakdown

Events

Historical Summary

FIGURE 9 expel  Refractor  Alert Taxonomy ▾  Signal From Anywhere ▾  Legacy Engine ▾     Logout Signal From Anywhere / Integrations

| Integrations | Signals | Detections |
|---|---|---|
| 1 Password | Anomaly Duet | [Legacy] Mass account lockout |
| Active Directory | Armis Configuration Change | [Legacy] Suspicious password spraying activity |
| Apex One | Authentication Event | [Legacy] Web application exploit - brute force login attacks |
| Armis | Blowhorn Incident | [Legacy] Web application exploit - Buffer overflow |
| Auth0 | Break Glass Event | [Legacy] Web application exploit - DoS |
| Avi Vantage | Brute Force | [Legacy] Web application exploit - SQLi |
| Bloworn Playground | Container Introspection Event | Added New Admins In Auth0 Portal From Suspicious IP |
| Check Point | Falco Alert | Anomaly Alert |
| Cisco ASA | File Event | Anonymous request was authorized |
| Cisco Umbrella | Google Chronicle Alert | API event from a suspicious location |
| Cloudflare | Google Chronicle Detection | Armis Configuration Change |
| CrowdStrike | Google Workspace Event | Armis Tagged Asset Threat Detection |
| Extrahop | Kubernetes Control Plane Event | Armis Threat Detection Alert |
| Github | Mfa Event | Attempt to access sensitive credential data |
| Gitlab | Mfa Timed Out | Authentication from a suspicious IP |
| Google Chronicle (Spotify AB) | Network Analytical Event | Authentication with a suspicious user-agent |
| Google Workspace Alert Center | Network Categorical Threat | Breakglass Account Alert |
| Intune | Network Connection Event | Chronicle Custom Mapping(High) |
| Jamf Protect | Phishing Event | Chronicle Custom Mapping(Medium) |
| Kubernetes | Policy Violation | ClusterRoleBinding to default cluster role |
| Lacework | Process Event | Commands executed on pod via exec |
| LogRhythm (Alarms) | Raw Investigative Action | Configuration Change Alert |

FIGURE 11

Integrations

[Filter integrations...]

| Name ⊕ | Description | Source Model | Organization Scope | |
|---|---|---|---|---|
| AWS Cloudtrail | AWS Cloudtrail integration | | all | edit |
| Active Directory | Active Directory | | all | edit |
| Apex One | Trend Micro Apex One | | all | edit |
| Armis | Armis | | all | edit |
| Auth0 | Auth0 | | all | edit |
| Avi Vantage | Avi Vantage | | all | edit |
| Azure Sentinel | Azure Sentinel SIEM | | all | edit |
| Blowdown Playground | Blowdown Playground | | all | edit |
| Check Point | Check Point | | all | edit |
| Cisco ASA | Cisco ASA | | all | edit |
| Cisco Firepower | Cisco Firepower | | all | edit |
| Cisco Meraki | Cisco Meraki Direct | Network Security | all | edit |
| Cisco Umbrella | Cisco Umbrella | | General Electric | edit |
| Cloudflare | Cloudflare WAF integration | | all | edit |
| Corelight | Corelight via Collector | | Expel Test Customer | edit |
| CrowdStrike | Falcon IDP | | all | edit |
| CrowdStrike Logscale (formerly Humio) Collector | CrowdStrike Logscale (formerly Humio) Collector | | all | edit |
| Datadog | Surfaces SIEM alerts from Datadog | | all | edit |
| EDR Sample Integration | Sample EDR integration to lay out example of robust normalization and detection strategy | | all | edit |
| Extrahop | Extrahop | | all | edit |
| Fortinalyzer | Fortinalyzer direct | | all | edit |
| Github | Github | | all | edit |
| Gitlab | Gitlab | | all | edit |
| Google Chronicle (Spotify AB) | Google Chronicle | | Spotify AB | edit |

FIGURE 12

| Integrations | Signals | Detections |
|---|---|---|
| 1Password | Api Activity | [Legacy] Mass account lockout |
| Active Directory | Authentication | [Legacy] Suspicious password spraying activity |
| Apex One | AWS Assumerole Workflow | [Legacy] Web application exploit - brute force login attacks |
| Armis | AWS Cloudtrail | [Legacy] Web application exploit - Buffer overflow |
| Auth0 | AWS Cloudtrail | [Legacy] Web application exploit - DoS |
| Avi Vantage | AWS String Search | [Legacy] Web application exploit - SQLi |
| AWS Cloudtrail | AWS Cloudtrail | API event from a suspicious country |
| Azure Sentinel | 1 Password Value Event | Authentication with a suspicious user-agent |
| Blowhorn Playground | 1 Password | Breakglass Account Alert |
| Check Point | Anomaly Duet | Configuration Change Alert |
| Cisco ASA | Armis Configuration Change | Critical severity vendor alert |
| Cisco Firepower | Armis | Custom Configuration Change Alert |
| Cisco Meraki | Authentication Event | Latitude AI |
| Cisco Umbrella | Blowhorn incident | Custom SIEM Alert |
| Cloudflare | Break Glass Event | EDR C2 |
| Corelight | Brute Force | EDR Credential Access |
| CrowdStrike | Container Introspection Event | EDR Defense Evasion |
| CrowdStrike Logscale (formerly Humio) Collector | Kubernetes | EDR Discovery |
| Datadog | Createtaskdefinition | EDR Execution |
| | AWS Cloudtrail | EDR Impact |
| EDR Sample Integration | Detection Finding | EDR Initial Access |
| Extrahop | Email Activity | EDR Lateral Movement |
| Fortianalyzer | Falco Alert | EDR Persistence |
| Github | Kubernetes | EDR Privillege Escalation |
| Gitlab | File Event | High severity vendor alert |
| Google Chronicle (Spotify AB) | Generic Siem Alert | Kubernetes Port Forwarding to Pod |
| Google Workspace Alert Center | Google Chronicle Alert | Low severity vendor alert |
| Growth Demos and Simulations | Google Chronicle (Spotify AB) | |
| | Google Chronicle Detection | |
| | Google Chronicle (Spotify AB) | |

FIGURE 13

| Devices | Normalizers | Signals | Detections | Extensions | Settings |
|---|---|---|---|---|---|
| Create a new version | Logic Conversation Compare Explore | | | | |
| 39. 03c0bc50 deployed 4/29/2024 | Slug | | | | |
| | aws | | | | |
| 38. 342ba8a9 deployed 4/25/2024 | The slug is how device events are matched against this integration (e.g. "symantec_endpoint_Protection") | | | | |
| | Name | | | | |
| 37. 93a414dc deployed 4/16/2024 | AWS Cloudtrail | | | | |
| | The name of the integration (e.g. "Symmatic Endpoint Protection") | | | | |
| 36. 99ebe90e deployed 3/26/2024 | Description | | | | |
| | AWS Cloudtrail | | | | |
| 35. e8a43128 deployed 3/21/2024 | Describe this integration | | | | |
| 34. 95fc91f8 deployed 3/20/2024 | | | | | |
| 33. 66e2b8ff | | | | | |

FIGURE 14

20. 498d1664
pending review
19. 06bcb71c
deployed 10/25/2023
18. e8d66b41
deployed 10/24/2023
17. fec32042
deployed 10/16/2023
16. d8d0a235
deployed 10/5/2023
15. 6f9e5a83
deployed 10/4/2023
14. 5357f0b3
deployed 10/4/2023
13. 2a9529d5
deployed 10/4/2023
12. 1f119d6a
deployed 10/4/2023
11. 16e52966
deployed 9/12/2023
10. decdb849
deployed 9/12/2023

Name
Authentication - ConsoleLogin; AssumedRole
Expected Signals
Authentication - TEST AUTHENTICATION SIGNAL MAPPING x | Aws Cloudtrail - All AWS Cloudtrail events x
Log Tests (4/4 passing) o o o o o o o o o o o o o o o o

FIGURE 15

First, find some example device events that should trigger a signal.

Name
Authentication - ConsoleLogin; AssumedRole

Expected Signals
Authentication - TEST AUTHENTICTION SIGNAL MAPPING x | Aws Cloudtrail - All AWS Cloudtrail events x

Log
{

Confirm sensitive data has been scrubbed prior to saving an integration

Name
API Activity - CreateAccessKey; IAMUSer

Expected Signals
Api Activity - TEST SIGNAL NORMALIZATION x | Aws Cloudtrail - All AWS Cloudtrail events x

Log
{

Confirm sensitive data has been scrubbed prior to saving an integration

Name
Authentication - ConsoleLogin; Role

Expected Signals
Authentication - TEST AUTHENTICTION SIGNAL MAPPING x | Aws Cloudtrail - All AWS Cloudtrail events x

Log
{

Confirm sensitive data has been scrubbed prior to saving an integration

- deployed 3/14/2024
- 31. cd24165e
- deployed 2/16/2024
- 30. 1fcd1fa8
- deployed 1/25/2024
- 29. 7661fb4a
- deployed 1/19/2024
- 28. d755a001
- deployed 1/18/2024
- 27. d3c0f183
- deployed 12/12/2023
- 26. 6fb3892b
- deployed 12/7/2023
- 25. 9c1a0b6d
- deployed 11/28/2023
- 24. 6dd0ed5d
- deployed 11/2/2023
- 23. 972960da
- deployed 10/31/2023
- 22. 75c43106
- deployed 10/26/2023
- 21. fba6aa71
- deployed 10/25/2023

FIGURE 15(Cont..)

- Signals
  - Api Activity
  - Authentication
  - Aws Assumerole Workflow
  - Aws Cloudtrail
  - Aws String Search

| Name |
|---|
| AWS Assumerole Workflow - AssumeRole |

Expected Signals: Aws Cloudtrail - All AWS Cloudtrail events x

AWS Assumerole Workflow - normalize AssumeRole* cloudtrail events for rosy's AWS workflow x Log Confirm sensitive data has been scrubbed prior to saving an integration

| Name |
|---|
| Test ModifyImageAttribute event |

Expected Signals: Aws Cloudtrail - All AWS Cloudtrail events x

Api Activity - TEST SIGNAL NORMALIZATION x

Log

```
"awsRegion": "us-east-2",
"eventCategory": "Management",
"eventID": "50226a5d-aa67-4259-8018-5aa710108393",
"eventName": "ModifyImageAttribute",
"eventSource": "ec2.amazonaws.com",
"eventTime": "2023-12-12T17:08:58Z",
"eventType": "AwsApiCall",
"eventVersion": "1.08",
"managementEvent": true,
"readOnly": false,
"recipientAccountId": "232260931",
"requestID": "3c829d73-b55c-430b-a8fb-c2e345d26d9a",
"requestParameters":
"attributeType": "launchPermission",
"imageId": "ami-072831dd716ad37a5",
"launchPermission": {
"add": {
"items": [
```

| Name |
|---|
| RegisterTaskDefinition |

Tests (16/16 passing) ○○○○○○○○○○○○○○○○○○○○○○○○○○○○○

FIGURE 17

- Signals
  - Api Activity
  - Authentication
  - Aws Assumerole Workflow
  - Aws Cloudtrail
  - Aws String Search

| grok | guide to grok | built-in patterns | expel patterns |
|---|---|
| Value | "sourceIPAddress\":\s+\"%{IPORHOST}[\"|,?\"]" |

⊕ Signals

Identify specific signal types (such as login events, malware activity, network scanning, etc) to be evaluated against "common" (link to commomn detections here) detections Signal Type: Api Activity Description: TEST SIGNAL NORMALIZATION Describe this signal ☑ Acceptance Testing "Acceptance Testing" will cause any alerts originating from the signal to do so at "TESTING" severity -- Select a version Required Evidence
These types of evidence are required for the signal type

| jmespath | eventTime | ⊕ | : time | - | Event Time |
|---|---|---|---|---|---|
| + add a path | | | | | |
| jmespath | eventName | ⊕ | : api.operation | - | String Evidence |
| + add a path | | | | | |
| jmespath | eventSource | ⊕ | : api.service.name | - | String Evidence |
| + add a path | | | | | |
| literal | AWS Cloudtrail | ⊕ | : metadata.product.vendor_name | - | String Evidence |
| + add a path | | | | | |
| literal | 1.0.0 | ⊕ | : metadata.version | - | String Evidence |
| + add a path | | | | | |

Recommend Evidence
Any additional evidence to extract for the signal type

Tests (16/16 passing) ooooooooooooooooo

- Signals
  - Api Activity
  - Authentication
  - Aws Assumerole
  - Workflow
  - Aws Cloudtrail
  - Aws String Search

| Signal Type | Api Activity |
|---|---|
| Description | TEST SIGNAL NORMALIZATION |
| | -- Select a version |

Describe this signal

☑ Acceptance Testing
"Acceptance Testing" will cause any alerts originating from the signal to do so at "TESTING" severity
Required Evidence
These types of evidence are required for the signal type

| jmespath | eventTime | time | - | Event Time |
| +add a path | | | | |
| jmespath | eventName | api.operation | - | String Evidence |
| +add a path | | | | |
| jmespath | eventSource | api.service.name | - | String Evidence |
| +add a path | | | | |
| literal | AWS Cloudtrail | metadata.product.vendor_name | - | String Evidence |
| +add a path | | | | |
| literal | 1.0.0 | metadata.version | - | String Evidence |
| +add a path | | | | |

Recommend Evidence
Any additional evidence to extract for the signal type

| jmespath | responseElements.Console.Login | status | - | String Evidence |
| +add a path | | | | |
| jmespath | awsRegion | cloud.region | - | String Evidence |
| +add a path | | | | |
| jmespath | userIdentity.IdentityProvider | actor.idp.name | - | String Evidence |

Tests (16/16 passing)   o o o o o o o o o o o o o o o o

FIGURE 20

- Signals
  - Api Activity
  - Authentication
  - Aws Assumerole
- Workflow
  - Aws Cloudtrail
  - Aws String Search

| Signal Type | Api Activity | | | | | Select a version f3afda21 - 10/5/2023 |
|---|---|---|---|---|---|---|
| Description | TEST SIGNAL NORMALIZATION | | | | | |

Describe this signal

☑ Acceptance Testing
"Acceptance Testing" will cause any alerts originating from the signal to do so at "TESTING" severity Required Evidence
These types of evidence are required for the signal type

| jmespath | eventTime | | time | - | Event Time |
|---|---|---|---|---|---|
| +add a path | | | | | |
| jmespath | eventName | | api.operation | - | String Evidence |
| +add a path | | | | | |
| jmespath | eventSource | | api.service.name | - | String Evidence |
| +add a path | | | | | |
| literal | AWS Cloudtrail | | metadata.product.vendor_name | - | String Evidence |
| +add a path | | | | | |
| literal | 1.0.0 | | metadata.version | - | String Evidence |
| +add a path | | | | | [+] |

Recommend Evidence
Any additional evidence to extract for the signal type

| jmespath | responseElements.Console.Login | | status | - | String Evidence |
|---|---|---|---|---|---|
| +add a path | | | | | |
| jmespath | awsRegion | | cloud.region | - | String Evidence |
| +add a path | | | | | |
| jmespath | userIdentity.IdentityProvider | | actor.idp.name | - | String Evidence |

Tests (16/16 passing)

| Signals | | | | | |
|---|---|---|---|---|---|
| - Api Activity | +add a path | | | | |
| - Authentication | jmespath | userAgent | | unnamed | userAgent |
| - Aws Assumerole Workflow | +add a path | | | | |
| - Aws Cloudtrail | jmespath | userIdentity.accessKeyId | | accesskeyid | String Evidence |
| - Aws String Search | +add a path | | | | |
| | jmespath | errorCode \|\| 'Success' | | errorcode | String Evidence |
| | +add a path | | | | |
| | Conditions | | | | |
| | This signal will be extracted if every condition evaluates to true | | | | |
| | jmespath | eventName | | matches none of | |

Every element on the left hand side matches none of the following:

| startwith | literal | Describe |
| exactly | literal | AssumeRoleWithWebIdentity |

+add a matcher    +bulk add

+add a path signal requires at least 1 extractor
Signal Type
-- Select a signal --    -- Select a version --
Description
Enter description
Describe this signal
☑Acceptance Testing
"Acceptance Testing" will cause any alerts originating from the signal to do so at "TESTING" severity
Required Evidence
These types of evidence are required for the signal type
Recommend Evidence
Any additional evidence to extract for the signal type
Conditions
This signal will be extracted if every condition evaluates to true

- Signals
  - Api Activity
  - Authentication
  - Aws Assumerole Workflow
  - Aws Cloudtrail
  - Aws String Search +add a path

| jmespath | errorCode || 'Success' | errorcode | - | String Evidence |

+add a path

Conditions
This signal will be extracted if every condition evaluates to true

| jmespath | eventName | matches none of |

+add a path

Every element on the left hand side matches none of the following:

| startwith | literal | Describe |
| exactly | literal | AssumeRoleWithWebIdentity |

+add a matcher    +bulk add signal requires at least 1 extractor
Signal Type
-- Select a signal --    -- Select a version --
Description
Enter description
Describe this signal
ⓘAcceptance Testing
"Acceptance Testing" will cause any alerts originating from the signal to do so at "TESTING" severity
Required Evidence
These types of evidence are required for the signal type
Recommend Evidence
Any additional evidence to extract for the signal type
Conditions
This signal will be extracted if every condition evaluates to true

| jmespath | eventName | matches any of |

At least one element on the left hand side matches at least one of the following:

| exactly | literal |

+add a matcher    +bulk add

Create new version

FIGURE 25

SYSTEMS, METHODS, AND GRAPHICAL USER INTERFACES FOR ACCELERATING A CONSTRUCTION OF A DATA INTEGRATION FOR A NON-INTEGRATED TECHNOLOGY DATA SOURCE

CROSS-REFERENCE TO RELATED APPLICATIONS

This application claims the benefit of U.S. Provisional Application No. 63/521,968, filed 20 Jun. 2023, which is incorporated in its entirety by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE INVENTION(S)

In one embodiment, a computer-program product embodied in a non-transitory machine-readable storage medium storing computer instructions that, when executed by one or more processors, perform operations that provide a graphical user interface including: a plurality of integration-identifying user interface input elements configured to receive one or more strings of text for specifying a set of integration identification parameters that characterize an in-development security integration for a third-party security service; a plurality of signal-specific data mapping containers that are instantiated based on receiving a plurality of inputs selecting a signal mapping addition control button of the graphical user interface, each distinct signal-specific data mapping container of the plurality of signal-specific data mapping containers being configured to receive inputs of characters to map technology-specific data attributes of the third-party security service to technology source-agnostic data attributes required by a distinct technology source-agnostic event signal type of a plurality of predetermined technology source-agnostic event signal types; a plurality of distinct raw event simulation containers that are instantiated based on receiving a set of inputs selecting a simulation addition control button of the graphical user interface, each distinct raw event simulation container of the plurality of distinct raw event simulation containers being configured to receive input of: (i) a distinct raw event generated by the third-party security service, and (ii) an expected technology source-agnostic event signal type for validating that the in-development security integration accurately translates the distinct raw event to the expected technology source-agnostic event signal type using mapping instructions specified by one of the plurality of signal-specific data mapping containers; and an integration deployment control element configured to receive an input for transitioning the in-development security integration to a deployed state.

In one embodiment, the in-development security integration, when deployed, defines an integration nexus between the third-party security service and a cybersecurity event detection and response service.

In one embodiment, one of the plurality of signal-specific data mapping containers includes a signal type user interface element that, when operated, displays a drop-down menu element of the plurality of predetermined technology source-agnostic event signal types, and the one of the plurality of signal-specific data mapping containers further includes: a plurality of source-to-target data mapping user interface elements that are dynamically instantiated based on receiving a selection of a target technology source-agnostic event signal type from the drop-down menu element of the plurality of predetermined technology source-agnostic event signal types.

In one embodiment, each distinct source-to-target data mapping user interface element of the plurality of source-to-target data mapping user interface elements includes: (a-i) a target data attribute user interface element that indicates a technology source-agnostic data attribute required by the target technology source-agnostic event signal type, and (a-ii) a source data attribute user interface input element configured to receive an input of a technology-specific data attribute of the third-party security service that corresponds to the technology source-agnostic data attribute.

In one embodiment, the one of the plurality of signal-specific data mapping containers further includes a condition-setting user interface element that is configured to receive an input of one or more conditions that must be satisfied prior to a generation or an extraction of a technology source-agnostic event signal of the target technology source-agnostic event signal type from a given raw event that occurred at the third-party security service.

In one embodiment, the graphical user interface further includes a simulation outcome user interface indicator for each distinct raw event simulation container of the plurality of distinct raw event simulation containers, wherein each simulation outcome user interface indicator is configured to indicate a simulation outcome or simulation result that corresponds to a subject raw event simulation container of the plurality of distinct raw event simulation containers.

In one embodiment, the plurality of distinct raw event simulation containers includes a first raw event simulation container, the first raw event simulation container includes a first raw event and a first expected technology source-agnostic event signal type for simulating if the in-development security integration accurately translates the first raw event to a technology source-agnostic event signal of the first expected technology source-agnostic event signal type, the simulation outcome user interface indicator that corresponds to the first raw event simulation container is of a first color when a successful translation of the first raw event to the technology source-agnostic event signal of the first expected technology source-agnostic event signal type occurs, and the simulation outcome user interface indicator that corresponds to the first raw event simulation container is of a second color different from the first color when an unsuccessful translation of the first raw event to the technology source-agnostic event signal of the first expected technology source-agnostic event signal type occurs.

In one embodiment, each of the plurality of signal-specific data mapping containers further includes a set of condition-setting user interface elements configured to receive an input of one or more logical conditions required to be satisfied before generating the distinct technology source-agnostic event signal type using the mapping instructions specified by a respective signal-specific data mapping container of the plurality of signal-specific data mapping containers.

In one embodiment, each of the plurality of signal-specific data mapping containers further includes a set of condition-setting user interface elements configured to receive an input of one or more logical conditions that must be satisfied before translating raw event data obtained from the third-party security service to the distinct technology source-agnostic event signal type specified by a respective signal-specific data mapping container of the plurality of signal-specific data mapping containers using the mapping instructions of the respective signal-specific data mapping container.

In one embodiment, a computer-implemented method includes displaying, via a data integration building user interface, a plurality of integration-identifying user interface input elements configured to receive one or more strings of text for specifying a set of integration identification parameters that characterize an in-development security integration for a third-party security service; displaying, via the data integration building user interface, a signal-specific data mapping container based on receiving an input selecting a signal mapping addition control button of the data integration building user interface, wherein the signal-specific data mapping container is configured to receive inputs of characters to map technology-specific data attributes of the third-party security service to technology source-agnostic data attributes required by a target technology source-agnostic event signal type; displaying, via the data integration building user interface, a raw event simulation container based on receiving an input selecting a simulation addition control button of the data integration building user interface, wherein the raw event simulation container is configured to receive input of: (i) a distinct raw event generated by the third-party security service, and (ii) an expected technology source-agnostic event signal type for validating that the in-development security integration accurately translates the distinct raw event to a technology source-agnostic event signal of the expected technology source-agnostic event signal type using mapping instructions specified by the signal-specific data mapping container; and displaying, via the data integration building user interface, an integration deployment control element that, when operated, transitions the in-development security integration to a deployed security integration.

In one embodiment, the computer-implemented method further includes at a cybersecurity event detection and response service: identifying that the third-party security service is in inoperable communication with the cybersecurity event detection and response service; and instantiating, via one or more computers, the data integration building user interface based on identifying that the third-party security service is in inoperable communication with the cybersecurity event detection and response service, wherein the data integration building user interface is digitally accessible by a user of the cybersecurity event detection and response service.

In one embodiment, transitioning the in-development security integration to the deployed security integration includes installing, via one or more computers, the mapping instructions of the in-development security integration into a database or repository storing a plurality of previously deployed security data integrations.

In one embodiment, the computer-implemented method further includes receiving, via the one or more computers, a third-party event; identifying, within the database or repository storing the plurality of previously deployed security data integrations, a target security data integration of the plurality of previously deployed security data integrations that corresponds to the third-party event based on a type of the third-party event; and generating a corresponding technology source-agnostic event signal using mapping instructions defined by the target security data integration that corresponds to the third-party event.

In one embodiment, in response to generating the corresponding technology source-agnostic event signal: identifying, via the one or more computers, a selective subset of automated detection decisioning workflows of a plurality automated detection decisioning workflows digitally mapped to the corresponding technology source-agnostic event signal based on a signal type of the corresponding technology source-agnostic event signal; and evaluating, via the one or more computers, the corresponding technology source-agnostic event signal against the selective subset of automated detection decisioning workflows.

In one embodiment, the plurality of integration-identifying user interface input elements includes a first integration-identifying user interface input element configured to receive an input of a title that corresponds to the in-development security integration, a second integration-identifying user interface input element configured to receive an input of an integration description that corresponds to the in-development security integration, and a third integration-identifying user interface input element configured to receive an input of a slug that corresponds to the in-development security integration.

In one embodiment, the signal-specific data mapping container includes a signal type user interface element that, when selected, displays a drop-down menu element of a plurality of technology source-agnostic event signal types provided by a cybersecurity event detection and response service.

In one embodiment, the computer-implemented method further includes dynamically instantiating, within the signal-specific data mapping container, a plurality of source-to-target data mapping user interface elements based on receiving a selection of the target technology source-agnostic event signal type from the drop-down menu element of the plurality of technology source-agnostic event signal types.

In one embodiment, the target technology source-agnostic event signal type is associated with a plurality of signal versions, wherein each signal version of the plurality of signal versions corresponds to a distinct iteration of the target technology source-agnostic event signal type, the signal-specific data mapping container further includes a version-controlled user interface element that, when selected, displays a drop-down menu element of the plurality of signal versions that correspond to the target technology source-agnostic event signal type.

In one embodiment, the computer-implemented method further includes dynamically instantiating, within the signal-specific data mapping container, a plurality of source-to-target data mapping user interface elements based on: (a) receiving a selection of the target technology source-agnostic event signal type from the drop-down menu element of the plurality of technology source-agnostic event signal types, and (b) receiving a selection of a target signal version of the target technology source-agnostic event signal type from the drop-down menu element of the plurality of signal versions.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: displaying, via a data integration building user interface, a plurality of integration-identifying user interface input elements configured to receive one or more strings of text for specifying a set of integration identification parameters that characterize an in-development security integration for a third-party security service; displaying, via the data integration building user interface, a signal-specific data mapping container based on receiving an input selecting a signal mapping addition control button of the data integration building user interface, wherein the signal-specific data mapping container is configured to receive inputs of characters to map technology-specific data attributes of the third-party security service to technology source-agnostic data attributes required by a target technology source-agnostic event signal type; displaying, via the data integration building user interface, a raw event simulation container based on receiving an input selecting a simulation addition control button of the data integration building user interface, wherein the raw event simulation container is configured to receive input of: (i) a distinct raw event generated by the third-party security service, and (ii) an expected technology source-agnostic event signal type for validating that the in-development security integration accurately translates the distinct raw event to a technology source-agnostic event signal of the expected technology source-agnostic event signal type using mapping instructions specified by the signal-specific data mapping container; and displaying, via the data integration building user interface, an integration deployment control element that, when operated, transitions the in-development security integration to a deployed security integration.

BRIEF DESCRIPTION OF THE FIGURES

FIG. 2 illustrates an example method 200 in accordance with one or more embodiments of the present application; and FIGS. 3-26 illustrate example graphical user interfaces for constructing and deploying a data integration within a web-accessible integration platform, according to some embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
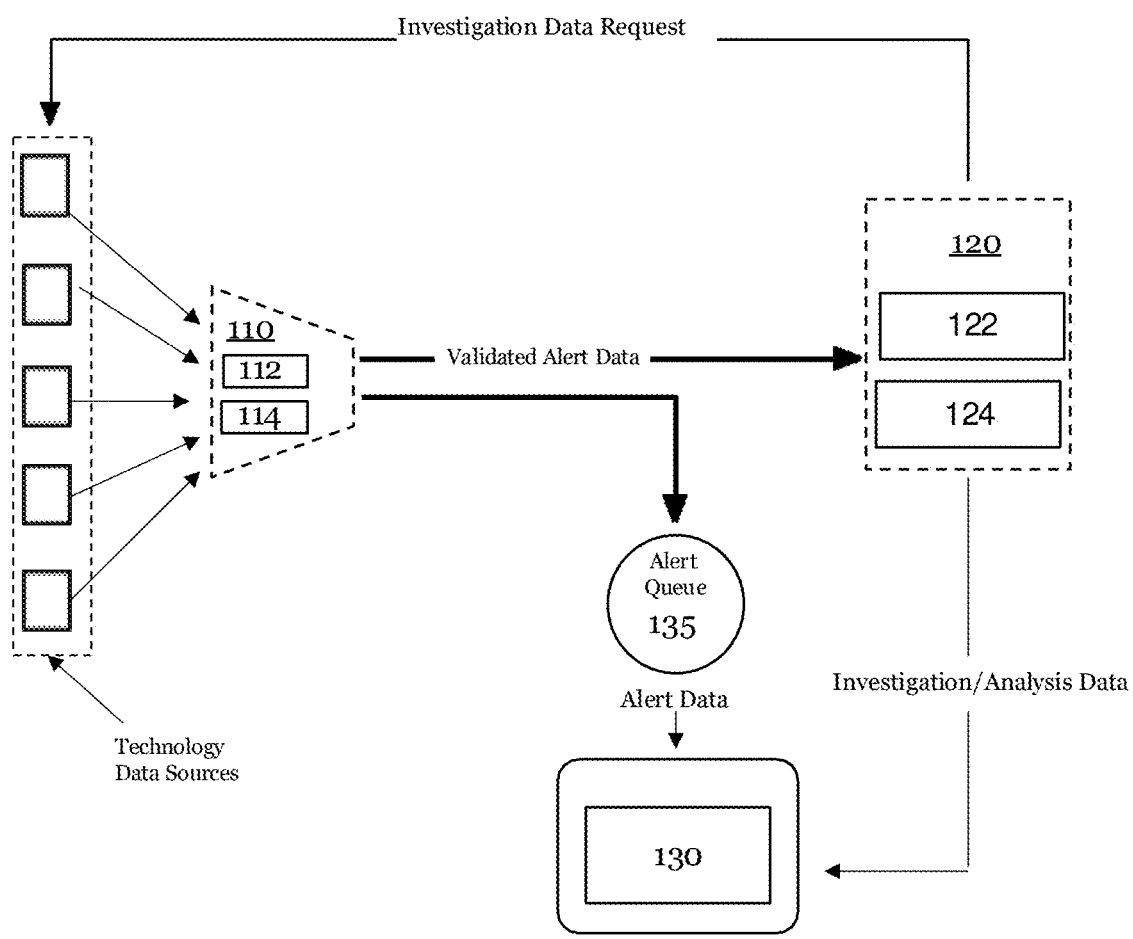
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service. The system 100 may function to enable real-time cybersecurity threat detection, agile, and intelligent threat response for mitigating detected security threats.

1.1 Security Alert Engine

The security alert aggregation and identification module no, sometimes referred to herein as the "security alert engine 110" may be in operable communication with a plurality of distinct sources of cyber security alert data. In one or more embodiments, the module no may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine no may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine no may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in one or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Intelligently Constructing a Data Integration for a Non-Integrated Technology Data Source As shown in FIG. 2, a method 200 for intelligently constructing a data integration for a non-integrated technology data source may include identifying a non-integrated technology data source S205, obtaining a corpus of raw event data associated with the non-integrated technology data source S210, instantiating a technology integration user interface S220, constructing and simulating a data integration for the non-integrated technology data source using the technology integration user interface S230, and deploying the data integration S240.

2.05 Identifying a Non-Integrated Technology Data Source

S205, which includes identifying a non-integrated technology data source, may function to identify one or more technology data sources that may be in inoperable communication with the cybersecurity event detection and response service. A non-integrated technology data source, as generally referred to herein, may be a technology data source that is not integrated and/or in inoperable communication with the cybersecurity event detection and response service. It shall be noted that the phrase "technology data source" may be interchangeably referred to herein as a "security data source", a "security device", or the like.

In one or more embodiments, a system or service implementing method 200 may enable an accelerated construction of a data integration for a non-integrated technology data source (e.g., non-integrated security device or the like). In such embodiments, based on a construction of a data integration for the non-integrated technology data source (e.g., non-integrated security device), the system or service implementing method 200 may function to recognize and/or identify the non-integrated technology data source as an integrated technology data source (e.g., integrated security device). An integrated technology data source, as generally referred to herein, may enable the system or service implementing method 200 (e.g., the cybersecurity event detection and response service) to receive, obtain, and/or process security event/alert data from the integrated technology data source (e.g., integrated security device). Conversely, a non-integrated technology data source may prevent the cybersecurity event detection and response service from receiving, obtaining, and/or processing security event/alert data from the non-integrated technology data source.

Accordingly, in one or more embodiments, S205 may function to implement a web-accessible integration platform that may include a graphical user interface that displays a current set of technology data sources integrated with the cybersecurity event detection and response service and, optionally, a user interface element that, when selected, provides one or more users a capability of constructing a data integration for a (e.g., target) non-integrated technology data source entirely within the web-accessible integration platform, as shown generally by way of example in FIG. 3, FIG. 12, and FIG. 13. In such embodiments, based on receiving one or more inputs or a sequence of inputs from a target user using the graphical user interface, S205 may function to identify (e.g., obtain, receive, etc.) a non-integrated technology data source that the target user prefers the cybersecurity event detection and response service to have a data integration therewith.

Stated another way, in one or more embodiments, a system or service implementing method 200 may function to provide a data integration building platform or data integration building user interface that enables users to accelerate a creation of a data integration for a target security device (e.g., iPassword®, Amazon Web Services, Amazon Web Services Cloud Trail®, Azure Kubernetes Service®, Azure Monitor Log Analytics®, Netskope Cloud Access Security Broker®, Sumo Logic Cloud SIEM®, CrowdStrike Falcon®, GitHub®, etc.) of a subscriber.

2.10 Obtaining a Corpus of Raw Event Data

S210, which includes obtaining a corpus of raw event data, may function to collect and/or store one or more corpora of raw event data associated with a non-integrated technology data source. A corpus of raw event data associated with a non-integrated technology data source (e.g., non-integrated security device), as generally referred to herein, may include a plurality of distinct raw events occurring at, generated by, and/or processed by the non-integrated technology data source (e.g., non-integrated security device). It shall be noted that S210 may function to obtain the one or more corpora of raw event data in a variety of modes.

In one or more embodiments, S210 may function to obtain or receive a corpus of raw event data associated with a subject non-integrated technology data source based on a preferred data upload scheme of a target user, a target subscriber, and/or the system or service implementing the method 200.

In a first implementation, a target user may upload one or more documents (or files) that includes one or more corpora of raw event data via a data corpus upload graphical user interface or the like. Stated another way, a target user may upload one or more distinct corpora of raw event data via a web-accessible graphical user interface.

Additionally, or alternatively, in a second implementation, S210 may function to receive and/or obtain batches of raw event data using one or more application programming interfaces of the non-integrated technology data source. For instance, in a non-limiting example, via the one or more application programming interfaces of the non-integrated technology data source, S210 may function to receive or collect batches of raw event data from the non-integrated technology data source.

Figure 7:
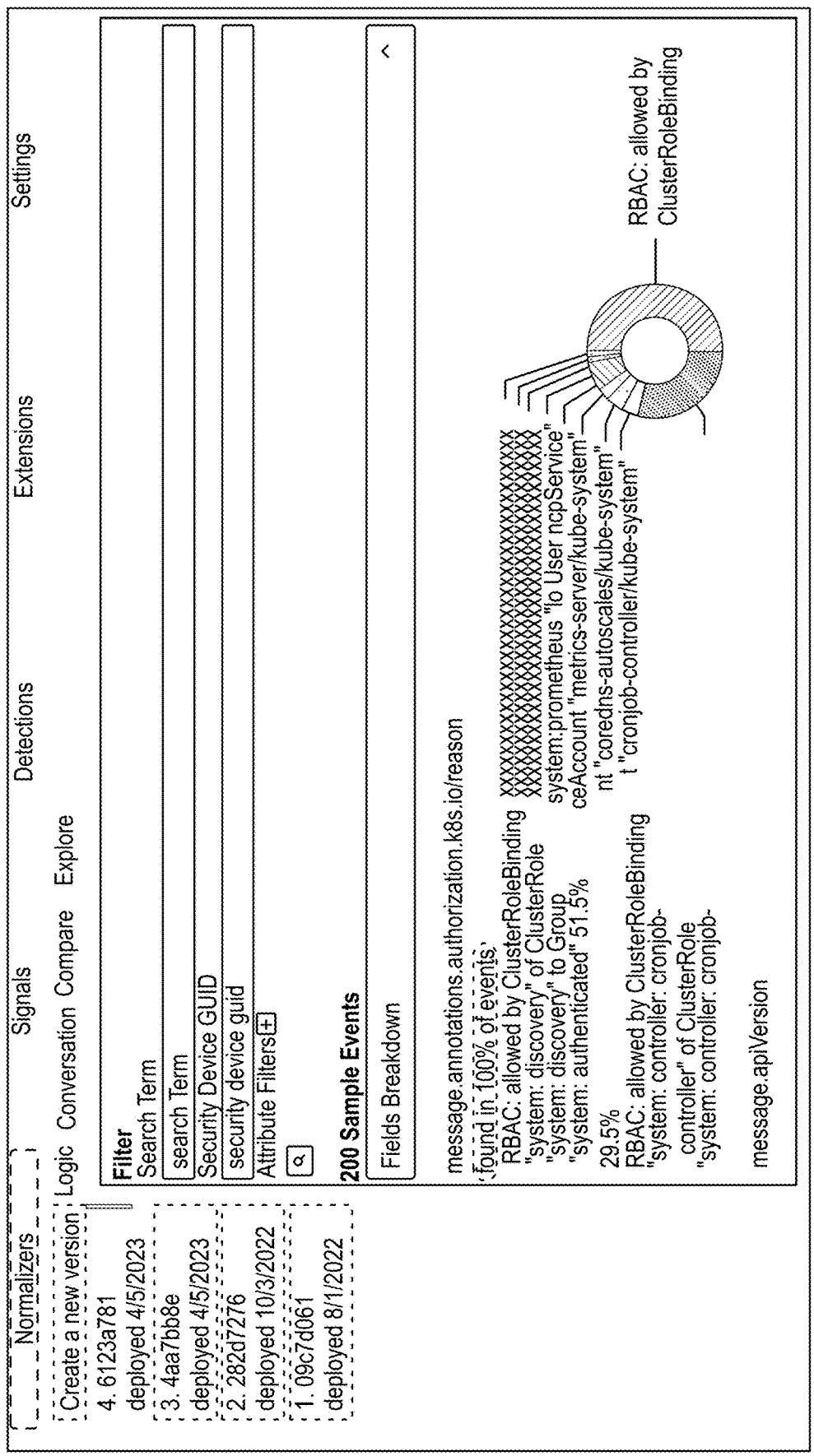

At least one technical benefit of obtaining the one or more corpora of raw event data may enable an accelerated assessment of raw event data included in the one or more corpora of raw event data, a sampling of raw events included in the one or more corpora of raw event data, and/or an automated exploratory data analysis of the one or more corpora of raw event data to surface, via a graphical user interface, probative cybersecurity-informative data fields included in the one or more corpora of raw event data that may aid in configuring an integration and/or downstream event detection logic, as shown generally by way of example in FIG. 7.

For instance, in a non-limiting example, based on obtaining one or more corpora of raw event data, the above-mentioned graphical user interface may function to indicate a frequency of fields included in the one or more corpora of raw event data. In such a non-limiting example, the above-mentioned graphical user interface may indicate that the 'message.annotations.authorization.k8s.io/reason' data field occurred in each piece of raw event data of the one or more corpora of raw event data. According, in one or more embodiments, a user may use this information when building or constructing a data integration for a non-integrated security device.

2.20 Instantiating a Technology Integration User Interface

S220, which includes instantiating a technology integration user interface, may function to instantiate a technology integration user interface that may provide a capability of configuring and/or building a data integration within the web-accessible integration platform. In one or more embodiments, a structure or arrangement of the technology integration user interface may enable a target user, who may have limited-to-no experience in constructing data integrations, to intuitively construct one or more data integrations for one or more non-integrated technology data sources, respectively. It shall be noted that the phrase "technology integration user interface" may also be referred to herein as an "integration configuration user interface" or the like.

Stated differently, another technical advantage of implementing the no-code, web-accessible integration platform includes eliminating the barrier for non-technical users to construct data integration and further eliminates the need for users to perform complex data integration and data manipulation tasks.

Layout of Technology Integration User Interface

In one or more embodiments, a layout of the technology integration user interface may include a plurality of distinct regions and/or portions that collectively correspond to a plurality of distinct technology integration building stages. The distinct regions and/or portions of the technology integration user interface, in one or more embodiments, may enable target users or the like to intuitively configure a data integration for a non-integrated technology data source, simulate (e.g., test) the data integration configured for the non-integrated technology data source, and deploy the data integration into production. Stated another way, the technology integration user interface may intelligently include the user interface elements and/or operably communicate with the modules, engines, and/or components necessary to configure, simulate, and deploy a data integration for a subject non-integrated technology data source (e.g., non-integrated security device). Thereby, reducing a likelihood that a target user may need to navigate to other integration platforms, integration data repositories, and/or integration user interfaces to configure, simulate, and/or deploy the data integration.

(i) Integration Overview Region of Technology Integration User Interface

Figure 4:
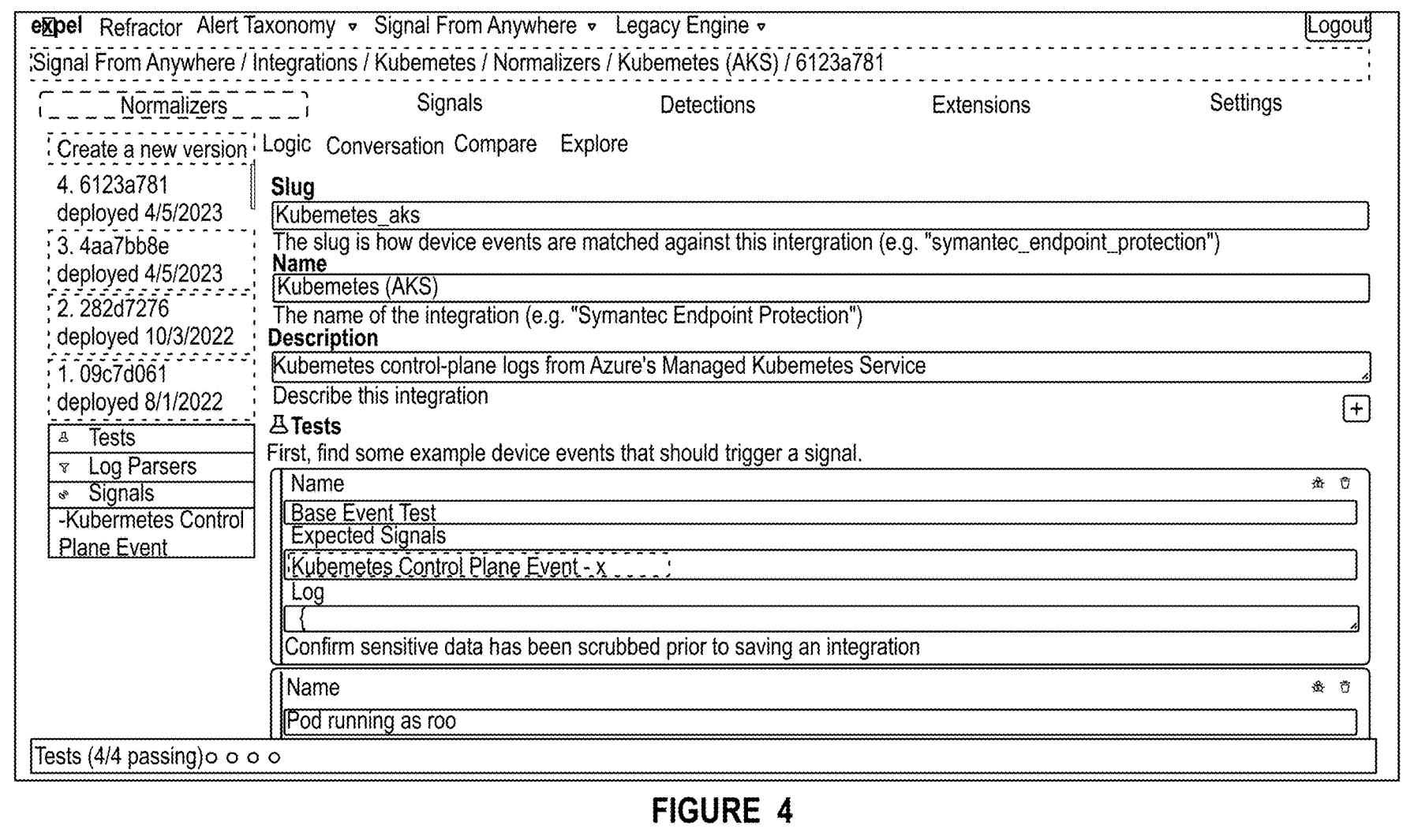
Figure 4A:
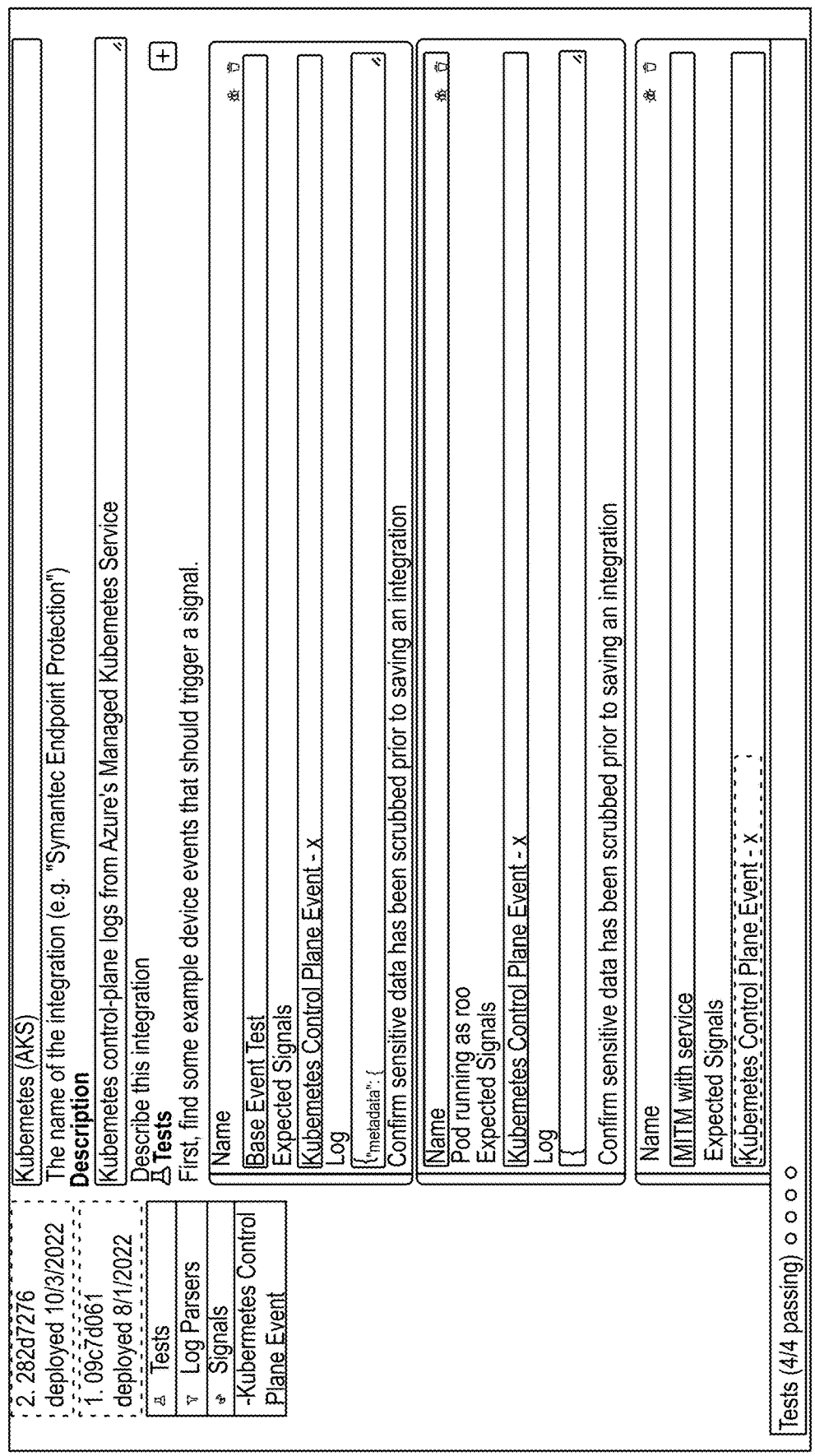

In one or more embodiments, the technology integration user interface may include an integration overview region, as shown generally by way of example in FIG. 4 and FIG. 14. The integration overview region, in one or more embodiments, may include one or more user interface elements that may provide a target user a capability of defining precursory integration data associated with the data integration.

For instance, in a non-limiting example, the integration overview region may include an integration title data field that may be configured to receive, as input, one or more text strings that may indicate a title of a subject data integration.

Additionally, or alternatively, in a non-limiting example, the integration overview region may include an integration description data field that may be configured to receive, as input, one or more text strings that may indicate a description of a subject data integration.

Additionally, or alternatively, in a non-limiting example, the integration overview region may include an integration slug data field that may be configured to receive, as input, one or more text strings that may indicate a slug of a subject data integration.

Stated another way, in one or more embodiments, S220 may function to instantiate a graphical user interface that includes a plurality of integration-identifying user interface input elements that may be configured to receive one or more strings of text for specifying a set of integration identification parameters that may characterize an in-development security integration for a third-party security service (e.g., third-party security device, third technology data source, or the like). In such embodiments, the plurality of integration-identifying user interface input elements may include a first integration-identifying user interface input element configured to receive an input of a title that corresponds to the in-development security integration. Additionally, or alternatively, in such embodiments, the plurality of integration-identifying user interface input elements may include a second integration-identifying user interface input element configured to receive an input of an integration description that corresponds to the in-development security integration. Additionally, or alternatively, in such embodiments, the plurality of integration-identifying user interface input elements may include a third integration-identifying user interface input element configured to receive an input of a slug that corresponds to the in-development security integration.

It shall also be noted that the integration overview region may include additional, fewer, or different integration data fields without departing from the scope of the present disclosure.

(ii) Event Data Normalization Region of Technology Integration User Interface

Figure 4C:
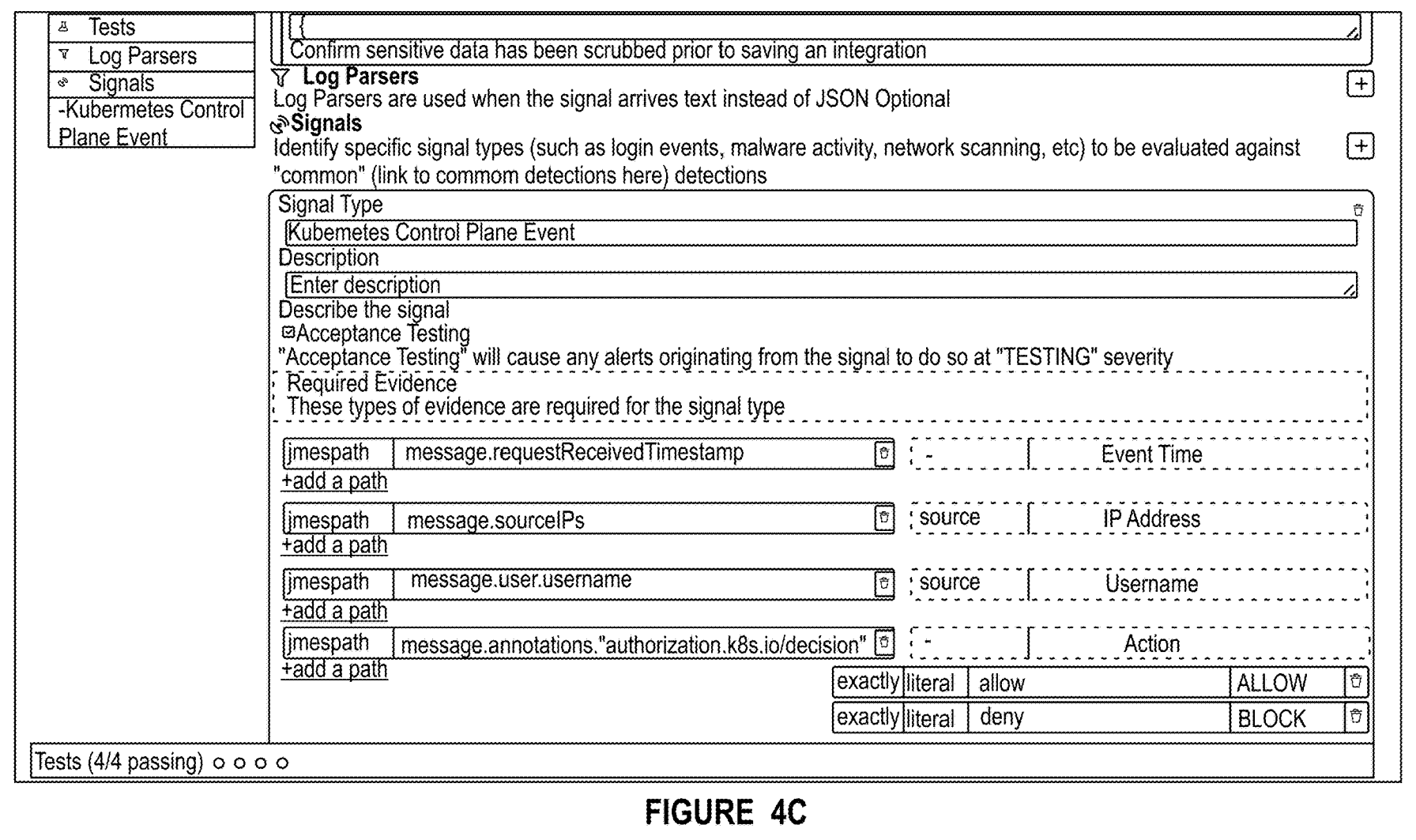
Figure 4E:
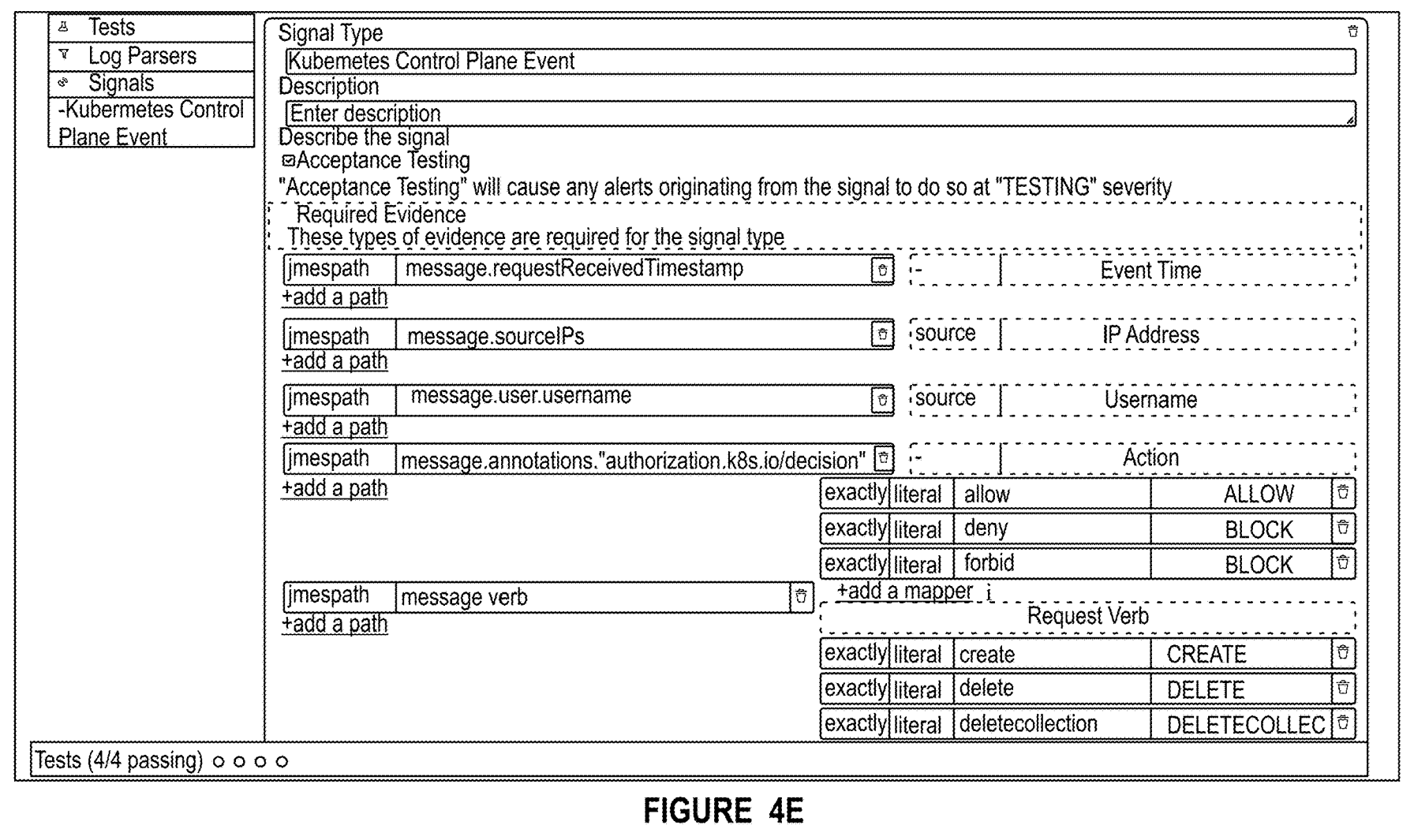

In one or more embodiments, the technology integration user interface may include an event data normalization region, as shown generally by way of example in FIG. 4C, FIG. 4D, and FIG. 4E. The event data normalization region, in one or more embodiments, may enable a target user to define one or more data integration nexuses between a target non-integrated technology data source and the cybersecurity event detection and response service. In such embodiments, each distinct data integration nexus may correlate raw event data fields, raw event data labels, raw event data tags, raw event data, raw event data paths and/or the like of the non-integrated technology data source to a distinct technology source-agnostic event signal of the cybersecurity event detection and response service, as described in more detail herein.

A distinct technology source-agnostic event signal, as generally referred to herein, may correspond to a distinct type of event signal and may include a data model comprising a first set of evidence data required by the distinct type of event signal and a second set of evidence data that is not required (e.g., optional, recommended, etc.) by the distinct type of event signal, as shown generally by way of example in FIG. 5. For instance, in a non-limiting example, one of a plurality of distinct technology source-agnostic event signals may correspond to an authentication-type event signal, as shown generally by way of example in FIG. 6.

It shall be noted that, in one or more embodiments, a system or service implementing method 200 may have a plurality of predetermined or predefined technology source-agnostic event signal types including, but not limited to, a technology source-agnostic authentication-type signal, a technology source-agnostic file event-type signal, a technology source-agnostic multi factor authentication-type signal, a technology source-agnostic detection finding-type signal, a technology source-agnostic policy violation-type signal, a technology source-agnostic break glass event-type signal, a technology source-agnostic threat intel event-type signal, a technology source-agnostic vendor alert-type signal, a technology source-agnostic anomaly duet-type signal, a technology source-agnostic security finding-type signal, a technology source-agnostic email activity-type signal, a technology source-agnostic brute force-type signal, a technology source-agnostic network categorical threat-type signal, a technology source-agnostic blowhorn incident-type signal, a technology source-agnostic API activity-type signal, a technology source-agnostic web application firewall event-type signal, a technology source-agnostic phishing event-type signal, a technology source-agnostic SIEM event-type signal, a technology source-agnostic vendor event-type signal, a technology source-agnostic network connection-type signal, and a technology source-agnostic process event-type signal, as shown generally by way of example in FIG. 4F.

Accordingly, in one or more embodiments, using one or more user interface elements of the event data normalization region of the technology integration user interface (e.g., data integration building user interface), a target user may map (e.g., normalize, associate, translate, etc.) raw event data fields, raw event data labels, raw event data paths (e.g., JMESPath, etc.) and/or raw event data tags of a non-integrated technology data source to event data fields (e.g., required evidence data fields, recommended evidence data fields, etc.) of a target technology source-agnostic event signal and/or target technology source-agnostic event signal type that is understandable and/or processable by the cybersecurity event detection and response service, as shown generally by way of example in FIG. 16 and FIGS. 18-26.

(iii) Integration Simulation Region of Technology Integration User Interface

In one or more embodiments, the technology integration user interface may include an integration simulation region, as shown generally by way of example in FIG. 4A, FIG. 4B, FIG. 15, and FIG. 17. The integration simulation region, in one or more embodiments, may enable a target user to simulate and/or test a data integration configured for a target technology data source. At least one technical benefit of simulating and/or testing the data integration may validate if the cybersecurity event detection and response service in conjunction with the data integration is normalizing and/or processing raw sample event data (e.g., log data, raw event data, etc.) of the target technology data source as expected. It shall be noted that the "integration simulation region" may also be referred to herein as "a signal testing region" or the like.

In one or more embodiments, the integration simulation region may enable the target user to configure one or more security event simulations (e.g., one or more security event tests or the like) based on receiving one or more user inputs and/or a sequence of user inputs associated with adding a security event simulation (e.g., security event test).

Additionally, or alternatively, in one or more embodiments, based on or in response to configuring the one or more security event simulations (e.g., the one or more security tests or the like), the one or more security event simulations may be automatically executed, via one or more processing devices of the cybersecurity event detection and response service, based on one or more event simulation execution criteria being satisfied. For instance, in a non-limiting example, the one or more security event simulations associated with a target data integration may be automatically executed, via one or more processing devices, based on detecting one or more algorithmic changes and/or programming logic changes associated with the target data integration to which the one or more security event simulations correspond. In another non-limiting example, the one or more security event simulations (e.g., tests) associated with a target data integration may be automatically executed, via one or more processing devices, based on instantiating a technology integration user interface that corresponds to the target data integration. In another non-limiting example, a target security event simulation (e.g., test) associated with a target data integration may be automatically executed, via one or more processing devices, based on receiving an input from a target user selecting a user interface object that, when selected, executes the target security event simulation.

Additionally, or alternatively, in one or more embodiments, the integration simulation region of the technology integration user interface may include a simulation results indicator that may graphically and/or textually provide findings data, result data, and/or outcome data associated with each of the one or more security event simulations configured for a target data integration. That is, in one or more embodiments, the simulation results indicator may include a distinct simulation findings user interface object for each distinct security event simulation. Accordingly, in one or more embodiments, the distinct simulation findings user interface object may visually and/or graphically indicate whether a result of a subject security event simulation was successful or not (e.g., pass, fail, etc.), as shown generally by way of example in FIG. 4, FIG. 4A, and FIG. 4B.

2.30 Constructing and Simulating a Data Integration using the Technology Integration User Interface S230, which includes constructing and simulating a data integration for a non-integrated technology data source, may function to construct and simulate the data integration using the technology integration user interface. In one or more embodiments, based on or in response to instantiating the technology integration user interface (e.g., a data integration building user interface), a target user may use the technology integration user interface to configure (e.g., construct and simulate) a data integration for a non-integrated technology data source (e.g., non-integrated security device). It shall be noted that, in one or more embodiments, a distinct data integration may be configured using the technology integration user interface on a per-technology technology data source basis or the like.

For instance, in a non-limiting example, based on receiving one or more user inputs at the technology integration user interface, a target user may function to configure and simulate a first data integration associated with a first, distinct non-integrated technology data source. Additionally, in such a non-limiting example, after building the first data integration, the target user may function to configure and simulate a second data integration for a second, distinct non-integrated technology data source (e.g., non-integrated third-party security service).

Using the Integration Overview Region of Technology Integration User Interface

In one or more embodiments, based on or in response to instantiating the technology integration user interface, the technology integration user interface may display the integration overview region that may be used, in part, to construct at least a portion of a data integration for a target non-integrated technology data source (e.g., currently non-integrated technology data source, currently non-integrated security device, currently non-integrated third-party security service, etc.). In such embodiments, the integration overview region may include a plurality of user interface objects and elements that may be configured to source, collect and/or obtain integration data (e.g., identifying integration information, precursory integration data, and/or the like) from a target user.

In one or more embodiments, the integration overview region may include an integration title data field that may be configured to receive, as input, one or more text strings that may indicate a title of a data integration. Stated another way, based on receiving one or more inputs at the integration title data field, the title of the data integration may be defined. For instance, in a non-limiting example, based on receiving one or more inputs from a target user at the integration title data field, the title of a data integration may be set as "Kubernetes (AKS)", as shown generally by way of example in FIG. 4.

Additionally, or alternatively, in one or more embodiments, the integration overview region may include an integration description data field that may be configured to receive, as input, one or more text strings that may indicate a description (e.g., summary or the like) of a data integration. Stated another way, based on receiving one or more inputs at the integration description data field, the description of the data integration may be defined. For instance, in a non-limiting example, based on receiving one or more inputs from a target user at the integration description data field, the description of the data integration may be set as "Kubernetes Control-Plane Logs from Azure's Managed Kubernetes Service", as shown generally by way of example in FIG. 4.

Additionally, or alternatively, in one or more embodiments, the integration overview region may include an integration slug data field that may be configured to receive, as input, one or more text strings that may indicate a slug (e.g., the slug is how device events are matched against the data integration). Stated another way, based on receiving one or more inputs at the integration slug data field, the slug of the data integration may be defined. For instance, in a non-limiting example, based on receiving one or more inputs from a target user at the integration slug data field, the slug of the data integration may be set as "Kubernetes_aks", as shown generally by way of example in FIG. 4.

Stated differently, in one or more embodiments, the graphical user interface (e.g., data integration building user interface, etc.) may include a plurality of integration-identifying user interface input elements that may be configured to receive one or more strings of text for specifying a set of integration identification parameters that may characterize an in-development security integration for a third-party security service (e.g., third-party security device, third technology data source, or the like). In such embodiments, the plurality of integration-identifying user interface input elements may include a first integration-identifying user interface input element configured to receive an input of a title that corresponds to the in-development security integration. Additionally, or alternatively, in such embodiments, the plurality of integration-identifying user interface input elements may include a second integration-identifying user interface input element configured to receive an input of an integration description that corresponds to the in-development security integration. Additionally, or alternatively, in such embodiments, the plurality of integration-identifying user interface input elements may include a third integration-identifying user interface input element configured to receive an input of a slug that corresponds to the in-development security integration.

Using the Event Data Normalization Region of Technology Integration User Interface In one or more embodiments, based on or in response to instantiating the technology integration user interface, the technology integration user interface may function to display the event data normalization region that may be used, in part, to construct at least a portion of a data integration for a target non-integrated technology data source (e.g., currently non-integrated technology data source). In such embodiments, the event data normalization region may include a selectable event normalization button that, when selected, may enable a user to add a target technology source-agnostic event signal data model of a plurality of distinct technology source-agnostic event signal data models within the event data normalization region of the technology integration user interface. It shall be noted that the "event data normalization region" may also be interchangeably referred to herein as a "signal transformation region" or the like.

In one or more embodiments, the event data normalization region of the technology integration user interface may be used to define one or more integration nexuses between a target non-integrated technology data source and a plurality of distinct technology source-agnostic event signal types of the cybersecurity event detection and response service. It shall be noted that each of the plurality of distinct technology source-agnostic event signal types may be configured to have a many-to-one relationship in which a plurality of technology data sources may have event normalization parameters and/or event transformation parameters defined for a subject technology source-agnostic event signal type (e.g., a first technology data source may have a first set of signal transformation parameters defined for a first technology source-agnostic event signal type, a second technology data source may have a second set of signal transformation parameters defined for the first technology source-agnostic event signal type, a third technology data source may have a second set of signal transformation parameters defined for the first technology source-agnostic event signal type, etc.). Thereby, enabling the cybersecurity event detection and response service to configure and/or execute detection logic (e.g., computer-executable event signal handling heuristics or the like) on the technology source-agnostic event signals, when generated, versus directly handling security events (e.g., raw security event data) of the plurality of distinct technology data sources that may be in a plurality of different shapes.

In one or more embodiments, each of the plurality of distinct technology source-agnostic event signal data models may correspond to a distinct technology source-agnostic event signal type. For instance, a first technology source-agnostic event signal data model may correspond to a first technology source-agnostic event signal type, a second technology source-agnostic event signal data model may correspond to a second technology source-agnostic event signal type, a third technology source-agnostic event signal data model may correspond to a third technology source-agnostic event signal type, and n-number of technology source-agnostic event signal data models may correspond to n-number technology source-agnostic event signal types, respectively. In a non-limiting example, a technology source-agnostic authentication event signal data model may correspond to a technology source-agnostic authentication event signal type, a technology source-agnostic phishing event signal data model may correspond to a technology source-agnostic phishing event signal type, a technology source-agnostic file event signal data model may correspond to a technology source-agnostic file event signal type, and a technology source-agnostic policy violation event signal data model may correspond to a technology source-agnostic policy violation event signal type.

In one or more embodiments, based on selecting the selectable event normalization button, the system or service implementing method 200 may function to display a plurality of distinct selectable representations in which each distinct selectable representation corresponds to a distinct one of the plurality of technology source-agnostic event signal types defined by the cybersecurity event detection and response service. Accordingly, based on identifying an input from a target user selecting one of the plurality of technology source-agnostic event signal types, S230 may function to display, within the event data normalization region of the technology integration user interface, the technology source-agnostic event signal data model that corresponds to the selected one of the plurality of technology source-agnostic event signal types. It shall be noted that, in one or more embodiments, the technology source-agnostic event signal data model may include a first set of evidence data types required by the selected one of the plurality of technology source-agnostic event signal types and a second set of evidence data types that is not required (e.g., optional, recommended, etc.) by the selected one of the plurality of technology source-agnostic event signal types. It shall be further noted that, for each distinct evidence data type required by the selected one of the plurality of technology source-agnostic event types and/or for each distinct evidence data type not required by the selected one of the plurality of technology source-agnostic event types, S230 may function to display a distinct set of correlative user interface elements that is configured to correlate (e.g., translate, map, etc.) a technology-specific evidence data label (or technology-specific data path) to a technology source-agnostic event data label (or technology source-agnostic event data path).

For instance, in a non-limiting example, based on receiving and/or detecting an input from a target user or the like selecting a selectable representation that corresponds to a technology source-agnostic kubernetes control plane event signal type, S230 may function to display the technology source-agnostic event signal data model including the evidence data types required by the selected one of the plurality of technology source-agnostic event signal types and/or the evidence data signal types not required (e.g., optional, recommended, preferred, etc.) by the selected one of the plurality of technology source-agnostic event signal types within the event data normalization region of the technology integration user interface, as shown generally by way of example in FIG. 4C, FIG. 4D, and FIG. 4E.

Accordingly, in such a non-limiting example, for each distinct evidence data type required by the technology source-agnostic kubernetes control plane event signal type and/or for each distinct evidence data type not required by the technology source-agnostic kubernetes control plane event signal type, S230 may function to display a distinct set of correlative user interface elements that is configured to correlate (e.g., translate, map, etc.) a technology-specific evidence data label (or type or category or path) to a technology source-agnostic event data label (or type or category or path). For instance, in such non-limiting example, one of the pieces of evidence required by the technology source-agnostic kubernetes control plane event signal type may be an event time, therefore, S230 may function to display a distinct set of correlative user interface elements that includes a first user interface element having an input data field that is configured to receive, as input, a location (e.g., a data path, JMESPath, or the like) to the event time attribute that may be identified within event data of the technology source-agnostic event data obtained by S210 and a second user interface element that indicates a target data label (e.g., Event Time) required by the technology source-agnostic kubernetes control plane event signal type to which the location (e.g., the path or the like) corresponds, as shown generally by way of example in FIG. 4C. Additionally, or alternatively, in such non-limiting example, one of the pieces of evidence required by the technology source-agnostic kubernetes control plane event signal type may be a username, therefore, S230 may function to display a distinct set of correlative user interface elements that includes a first user interface element having an input data field that is configured to receive a location (e.g., a path, JMESPath, or the like) to the username attribute within the technology source-agnostic event data obtained by S210 (or a target third-party security service) and a second user interface element that indicates a target data label (e.g., Username) required by the technology source-agnostic kubernetes control plane event signal type to which the location (e.g., the path or the like) corresponds, as shown generally by way of example in FIG. 4C. It shall be noted that, in one or more embodiments, the first user interface element may be in line with the second user interface element.

It shall be further noted that the event data normalization region of the technology integration user interface may include additional, fewer, or different technology source-agnostic event signal data models in analogous ways as described above.

Stated differently, in one or more embodiments, based on receiving a plurality of inputs selecting a signal mapping addition control button or the like, a system or service implementing method 200 may function to display, via the data integration building user interface, a plurality of signal-specific data mapping containers. In other words, the data integration building user interface may include a plurality of signal-specific data mapping containers that are instantiated based on receiving a plurality of inputs selecting a signal mapping addition control button of the graphical user interface. It shall be noted that, in one or more embodiments, each distinct signal-specific data mapping container of the plurality of signal-specific data mapping containers may be configured to receive input of characters to map technology-specific data attributes (e.g., JMESPath, data paths, etc.) of a target third-party security service to technology source-agnostic data attributes required by a distinct technology source-agnostic event signal type of a plurality of predetermined technology source-agnostic event signal types.

In other words, in a non-limiting example, based on receiving an input selecting a signal mapping addition control button or the like, a system or service implementing method 200 may function to display, via the data integration building user interface, a signal-specific data mapping container. The signal-specific data mapping container, in such a non-limiting example, may be configured to receive inputs of characters (e.g., JMESPath, data paths, etc.) associated with a target third-party security service to digitally map, digitally link, and/or digitally associate technology-specific data attributes of the target third-party security service to technology source-agnostic data attributes required by a target technology source-agnostic event signal type.

Additionally, in such a non-limiting example, the signal-specific data mapping container may include a signal type user interface element that, when operated, displays a drop-down menu element of the plurality of predetermined technology source-agnostic event signal types provided by the cybersecurity event detection and response service. Accordingly, in one or more embodiments, the signal-specific data mapping container may further include a plurality of source-to-target data mapping user interface elements (e.g., distinct sets of correlative user interface elements, distinct sets of source-to-target data mapping pairing user interface elements) that are dynamically instantiated based on receiving a selection of the target technology source-agnostic event signal type from the drop-down menu element of the plurality of predetermined technology source-agnostic event signal types.

It shall be recognized, in such embodiments, each distinct source-to-target data mapping user interface element of the plurality of source-to-target data mapping user interface elements may include a target data attribute user interface element that may indicate a technology source-agnostic data attribute required by the target technology source-agnostic event signal type and a source data attribute user interface input element that may be configured to receive an input of a corresponding technology-specific data attribute of the third-party security service that corresponds to the technology source-agnostic data attribute.

It shall be further recognized, in one or more embodiments, the signal-specific data mapping container may include a condition-setting user interface element that may be configured to receive an input of one or more conditions that must be satisfied prior to a generation or an extraction of a technology source-agnostic event signal of the technology source-agnostic event signal type based on a given raw event that occurred at the third-party security service.

Additionally, or alternatively, in one or more embodiments, a system or service implementing method 200 may function to display, via the data integration building user interface, a signal-specific data mapping container that is configured to receive inputs of characters to map technology-specific data attributes of a target third-party security service to technology source-agnostic data attributes required by a target technology source-agnostic event signal type.

Figure 26:
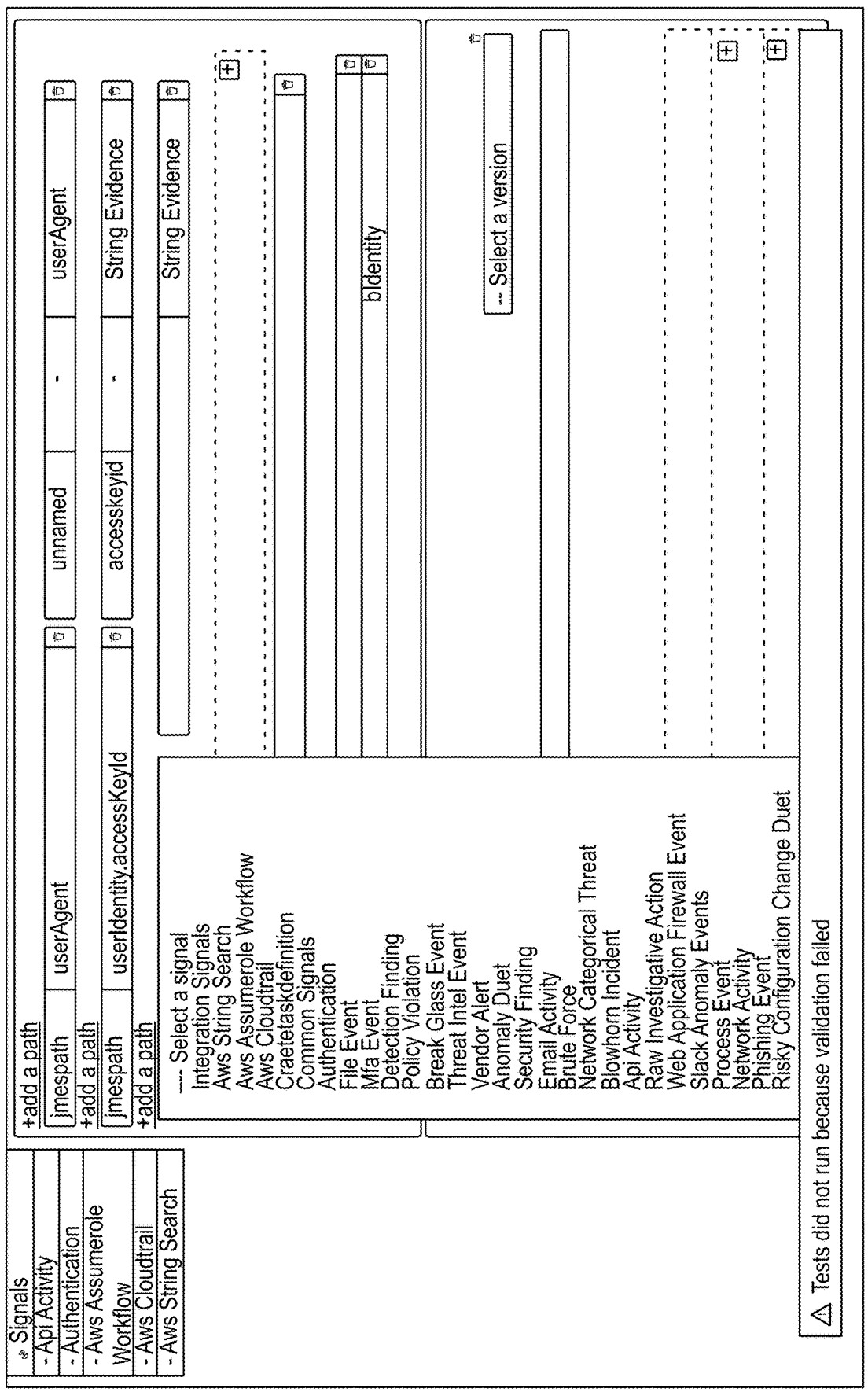

In one or more implementations of such embodiments, the signal-specific data mapping container may include a signal type user interface element that, when selected, displays a drop-down menu element of a plurality of technology source-agnostic event signal types provided by the cybersecurity event detection and response service, as shown generally by way of example in FIG. 26. In such embodiments, based on or in response to receiving a selection of the target technology source-agnostic event signal type from the drop-down menu element of the plurality of technology source-agnostic event signal types, a plurality of source-to-target data mapping user interface elements that corresponds to the target technology source-agnostic event signal type (e.g., the data model of the target technology source-agnostic event signal type) may be dynamically instantiated within the signal-specific data mapping container.

It shall be further noted, in one or more embodiments, the target technology source-agnostic event signal type may be associated with a plurality of signal versions (e.g., each signal version of the plurality of signal versions may correspond to a distinct iteration of the target technology source-agnostic event signal type). For instance, in a non-limiting example, the target technology source-agnostic event signal type may have or be associated with at least a first signal version of the target technology source-agnostic event signal type, a second signal version of the target technology source-agnostic event signal type that is an adaptation of the first signal version, and a third signal version of the target technology source-agnostic event signal type that is an adaptation of the second signal version. In other words, each subsequent signal version of any given technology source-agnostic event signal type may be an adaptation of its predecessor, allowing for iterative improvements and modifications. Thereby, enabling a system or service to evolve over time while maintaining compatibility with various iterations of the same fundamental signal type.

Thus, in one or more embodiments, the signal-specific data mapping container may further include a version-controlled user interface element (e.g., signal version-controlled user interface element) that, when selected, displays a drop-down menu element of the plurality of signal versions that correspond to or available for the target technology source-agnostic event signal type, as shown generally by way of example in FIG. 20 and FIG. 21.

Accordingly, in one or more additional implementations of such embodiments, a system or service implementing method 200 may function to dynamically instantiate, within the signal-specific data mapping container, a plurality of source-to-target data mapping user interface elements based on receiving a selection of the target technology source-agnostic event signal type from the drop-down menu element of the plurality of technology source-agnostic event signal types and receiving a selection of a target signal version of the target technology source-agnostic event signal type from the drop-down menu element of the plurality of signal versions.

Using the Integration Simulation Region of Technology Integration User Interface In one or more embodiments, based on or in response to instantiating the technology integration user interface, the technology integration user interface may function to display the integration simulation region that may be used, in part, to simulate and/or test a data integration configured for a target non-integrated technology data source (e.g., currently non-integrated technology data source). In one or more embodiments, simulating and/or testing the data integration configured for the target non-integrated technology data source may provide a probative indication to a target user, an analyst, or the like on whether the data integration is performing as expected, should be deployed into production, and/or should be reconfigured before implementing into production.

In one or more embodiments, the integration simulation region may include an add event simulation button that, when selected, may add a distinct event simulation template comprising a plurality of user interface elements within the integration simulation region. In such embodiments, the plurality of user interface elements may include one or more of a simulation name text box that is configured to receive an input of a title or description of a target integration simulation, a sample event data field that is configured to receive an input of a raw sample event associated with a target technology data source (e.g., the raw sample event is in a structure defined by the third-party technology data source), and an expected signal outcome data field that is configured to receive an input of one or more technology source-agnostic event signal types in which each technology source-agnostic event signal type included in the expected signal outcome data field is expected to be generated by the cybersecurity event detection and response service in response to the cybersecurity event detection and response service normalizing and processing the raw sample event included in the sample event data field.

For instance, in a non-limiting example, based on receiving an input selecting the add event simulation button, S230 may function to add a distinct event simulation template comprising the simulation name text box, the sample event data field, and the expected signal outcome data field within the integration simulation region. In such non-limiting example, based on receiving one or more inputs from a target user at the simulation name data field, the name of the integration simulation may be set as "Base Event Test". Additionally, or alternatively, in such a non-limiting example, based on receiving one or more inputs from a target user at the expected signal outcome data field, the expected signal outcome of the integration simulation may be set as "Kubernetes Control Plane Event". Additionally, or alternatively, in such a non-limiting example, based on receiving one or more inputs from a target user at the sample event data field, a sample (or raw) security event from a target third-party technology data source to which the data integration corresponds may be included within the sample event data field.

Accordingly, in such non-limiting example, based on configuring an integration simulation, S230 may function to display a simulation results indicator (on the technology integration user interface) that may indicate whether the sample (or raw) security event was properly normalized and processed by the cybersecurity event detection and response service when compared to the expected outcome data field.

Figure 8:
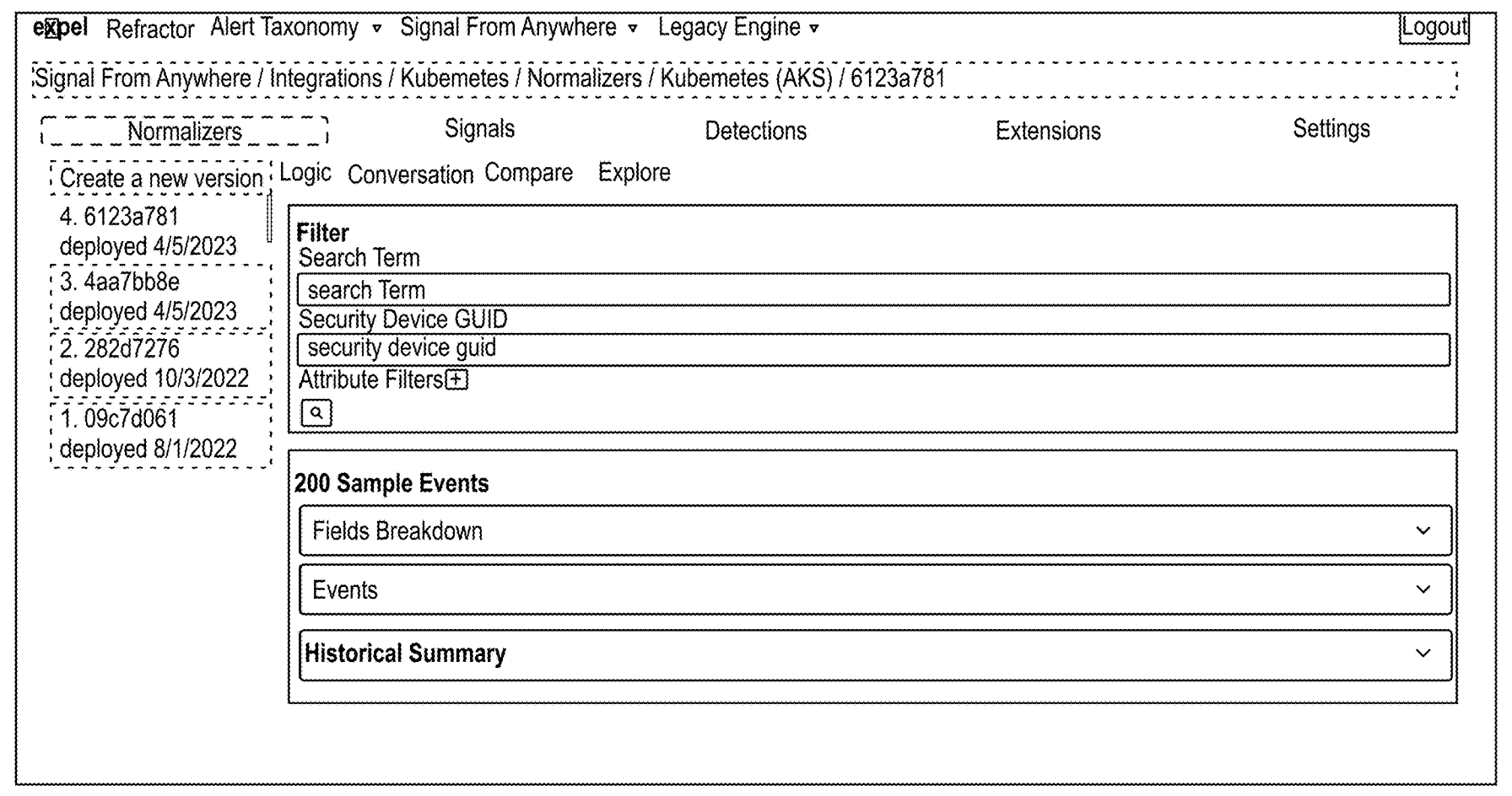
Figure 10:
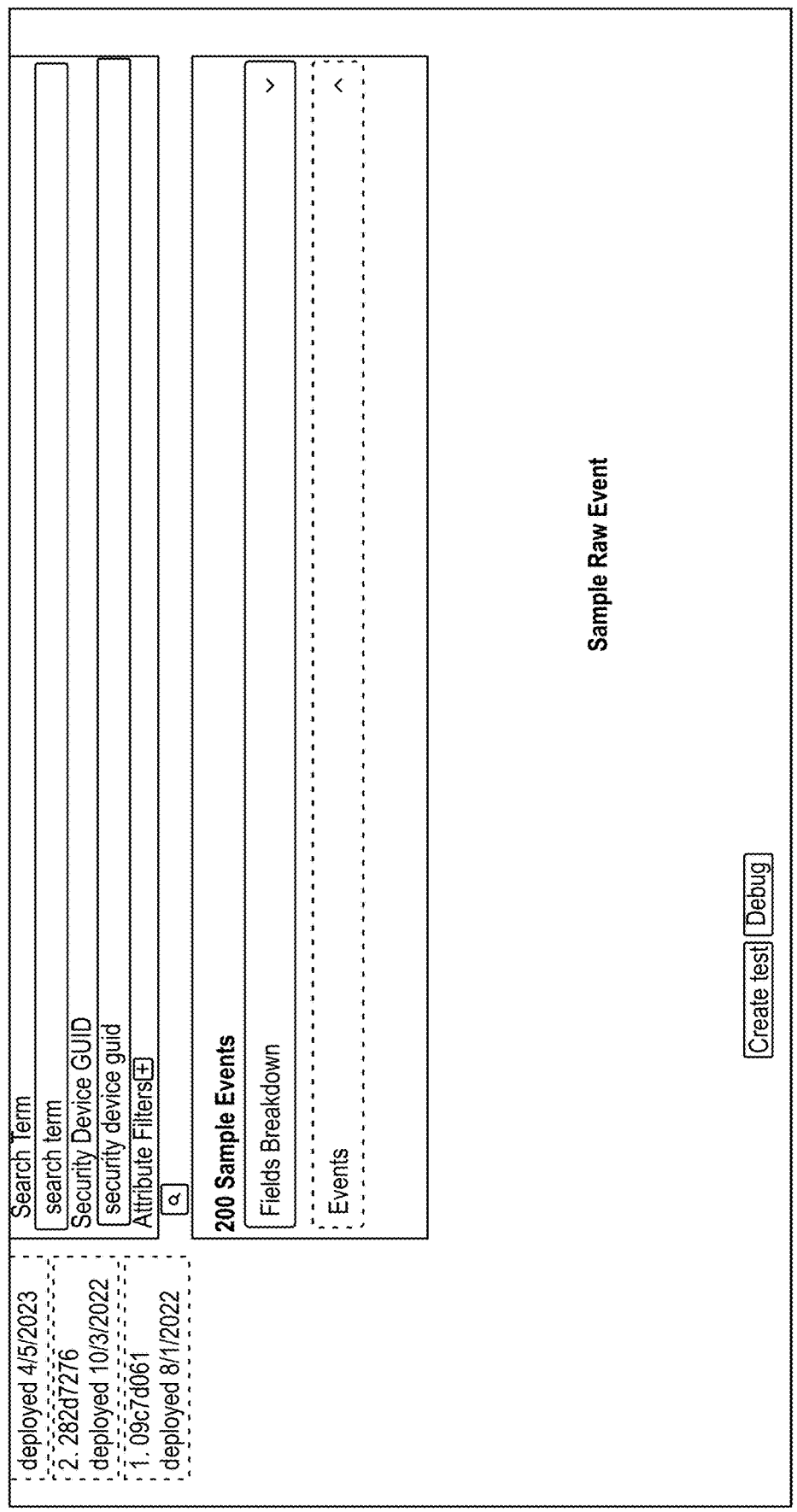
Figure 16:
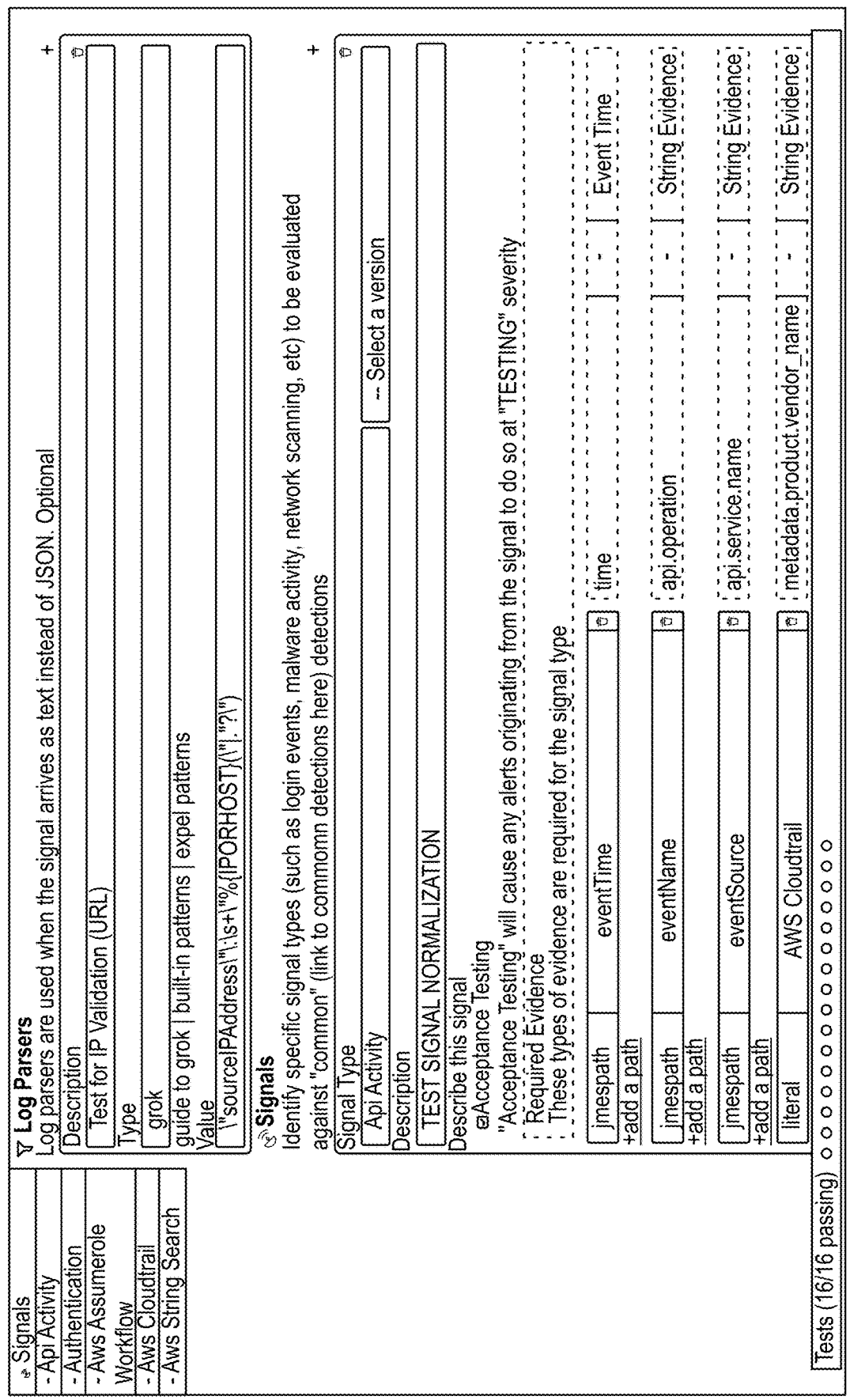

It shall be noted that, in some embodiments, S230 may function to add an integration simulation within the technology integration user interface based on receiving an input selecting a create test button on an exploratory data analysis user interface or the like. In such embodiments, the exploratory data analysis user interface may include a plurality of raw events and, in some embodiments, beneath each distinct raw event data sample may be a distinct create test button, as shown generally by way of example in FIGS. 8-10. Accordingly, based on detecting an input selecting a create test button on the exploratory data analysis user interface, S230 may function to add a new event simulation template comprising the simulation name text box, the sample event data field, and the expected outcome data field within the integration simulation region of the technology integration user interface. In such embodiments, the sample event data field may be automatically prepopulated with the sample raw event that corresponds with the (selected) create test button. The remainder of the data fields (e.g., the simulation name text box and the expected outcome data field) may receive user input data in analogous ways as described above.

It shall be further noted that S230 may function to configure additional, fewer, or different integration simulations in analogous ways as described above.

Additionally, or alternatively, in one or more embodiments, based on receiving a set of inputs selecting a simulation addition control button, a plurality of distinct raw event simulation containers may be instantiated within the graphical user interface (e.g., the data integration building user interface). In other words, the graphical user interface may include a plurality of distinct raw event simulation containers that are instantiated based on receiving a set of inputs selecting a simulation addition control button of the graphical user interface. In such embodiments, each distinct raw event simulation container of the plurality of distinct raw event simulation containers may be configured to receive an input of a distinct raw event generated by a target third-party security service (e.g., the third-party security service for which the data integration is being constructed) and an expected technology source-agnostic event signal (or expected technology source-agnostic event signal type) for validating that the corresponding in-development security integration accurately translates the distinct raw event to the expected technology source-agnostic event signal (or the expected technology source-agnostic event signal type) using mapping instructions specified by one of the plurality of signal-specific data mapping containers of the graphical user interface.

Additionally, or alternatively, in one or more embodiments, the graphical user interface may include a distinct simulation outcome user interface indicator for each distinct raw event simulation of a plurality of raw event simulation containers displayed on the graphical user interface. It shall be noted that, in such embodiments, each distinct simulation outcome user interface indicator may be configured to indicate a simulation outcome or simulation result that corresponds to a subject raw event simulation container of the plurality of raw event simulation containers.

For instance, in a non-limiting example, a subject simulation outcome user interface indicator (e.g., a first simulation outcome user interface indicator) may correspond to a subject raw event simulation container (e.g., a first raw event simulation container). In such a non-limiting example, the first simulation outcome user interface indicator may include a first raw event and a first expected technology source-agnostic event signal type for simulating if the in-development security integration accurately translates the first raw event to a technology source-agnostic signal of the first expected technology source-agnostic event signal type. In one or more embodiments, the first simulation outcome user interface indicator that corresponds to the first raw event simulation container may be of a first color (e.g., green) when a successful translation of the first raw event to a technology source-agnostic signal of the first expected technology source-agnostic event signal type occurs. In one or more embodiments, the first simulation outcome user interface indicator that corresponds to the first raw event simulation container may be of a second color (e.g., red) different from the first color (e.g., green) when an unsuccessful translation of the first raw event to a technology-source agnostic signal of the first expected technology source-agnostic event signal type occurs.

2.40 Data Integration Deployment

S240, which includes deploying a data integration, may function to deploy a data integration using the technology integration user interface. In one or more embodiments, via the technology integration user interface, S240 may function to deploy the data integration associated with a target technology data source based on and/or in response to determining that each of the one or more integration simulations associated with the target technology data source were successful (e.g., satisfying simulation criteria or the like.).

Stated another way, in one or more embodiments, the in-development security integration for a third-party security service, when deployed, may define an integration nexus between the third-party security service and the cybersecurity event detection and response service.

In one or more embodiments, using the technology integration user interface, the cybersecurity event detection and response service implementing method 200 may provide a target user a capability of fast-implementing and/or fast-deploying a data integration using the technology integration user interface. In such embodiments, based on S240 deploying the data integration for a non-integrated technology data source, the cybersecurity event detection and response service may convert and/or recognize the non-integrated technology data source as an integrated technology data source.

For instance, in a non-limiting example, S240 may function to implement and/or deploy a data integration in a production mode of operation based on receiving an input from the target user selecting a save integration button, an add integration button, or the like displayed on the technology integration user interface to which the data integration corresponds.

Stated another way, in one or more embodiments, the graphical user interface (e.g., data integration building user interface) may include an integration deployment control element that, when operated, transitions a corresponding in-development security integration to a corresponding deployed security integration. In one or more embodiments, transitioning the corresponding in-development security integration to the corresponding deployed security integration may include installing, via one or more computers, the mapping instructions defined by the in-development security integration into a database or repository storing a plurality of previously deployed security integrations.

Evaluation of Raw Third-Party Security Alert/Event Data

In one or more embodiments, a security alert engine (e.g., the security alert engine 110) may function to receive a plurality of raw security events from a plurality of distinct, integrated technology data sources. Accordingly, the security alert engine may function to process each of the raw security events through an event normalization layer that, in turn, normalizes the raw security events into a subset of technology source-agnostic event signals. For instance, based on the security alert engine receiving a raw security event associated with a third-party technology data source, the security alert engine may function to process the security event in accordance with the data integration configured for the third-party technology data source and, in turn, generate one or more distinct technology source-agnostic event signals based on the processing. It shall be noted that, in embodiments in which the security alert engine generates a technology source-agnostic event signal based on receiving a raw security event, the technology source-agnostic event signal may be routed to an event queue or the like when the technology source-agnostic event signal satisfies routing/alerting criteria of at least one of the one or more event detection and response heuristics mapped to the technology source-agnostic event signal. Conversely, in embodiments in which the security alert engine generates a technology source-agnostic event signal based on receiving a raw security event, the technology source-agnostic event signal may not be routed to an event queue or the like if the technology source-agnostic event signal fails to satisfy routing/alerting criteria of at least one of the one or more event detection and response heuristics mapped to the technology source-agnostic event signal.

At least one technical benefit of the security alert engine generating one or more distinct technology source-agnostic event signals based on receiving a raw security alert from a third-party data source may enable the cybersecurity event detection and response service to apply a detection layer over technology source-agnostic event signals rather than security alert data received from third-party data sources. Thereby, preventing detecting logic (e.g., detection rules, computable-executable detection heuristics, and/or the like) being constructed for each distinct technology data source to which the cybersecurity event detection and response integrates therewith. Stated another way, event detection and response logic (e.g., detection rules, computable-executable detection heuristics, and/or the like) are mapped to technology source-agnostic event signals rather than third-party technology data sources, as shown generally by way of example in FIG. 11.

It shall be noted that, in one or more embodiments, a plurality of distinct event detection and response heuristics may be mapped to each of a plurality of distinct technology source-agnostic event signals (or a plurality of distinct technology source-agnostic event signal types), in this way, when the security alert engine generates a technology source-agnostic event signal of a given type, the event detection and response heuristics that correspond to the given type of the technology source-agnostic event signal may be evaluated against the generated technology source-agnostic event signal to identify one or more of a likely threat severity (e.g., critical threat severity, high threat severity, medium threat severity, low threat severity, tuning threat severity, and/or the like) of the generated technology source-agnostic event signal, a likely event class (e.g., suspicious authentication, phishing, etc.) of the generated technology source-agnostic event signal, if the generated technology source-agnostic event signal should be routed to an event escalation queue based on satisfying escalation criteria of one or more of the event detection and response rules, if the generated technology source-agnostic event signal should be routed to an event disposal queue based on satisfying disposal criteria of the one or more event detection and response rules, etc.

In one or more embodiments, a system or service implementing method 200 may function to receive, via one or more computers, a third-party event and, in turn, identify, within a database or repository storing a plurality of previously deployed security data integrations, a target security data integration (e.g., target security device integration or the like) that corresponds to the third-party event based on a type of the third-party event (e.g., identify a CloudTrail integration based on the third-party event being a CloudTrail-type event). Accordingly, in such embodiments, the system or service implementing method 200 may function to generate a technology source-agnostic event signal using mapping instructions defined by the target security data integration (e.g., target security device integration or the like), as described in U.S. Patent Application No. 63/555,853, filed 20 Feb. 2024, titled SYSTEMS AND METHODS FOR AUTOMATICALLY CREATING NORMALIZED EVENTS IN A CYBERSECURITY THREAT DETECTION AND MITIGATION PLATFORM, which is incorporated herein in its entirety by this reference.

Additionally, or alternatively, in one or more embodiments, in response to generating the technology source-agnostic event signal, the system or service implementing method 200 may function to identify, via the one or more computers, a selective subset of automated detection decisioning workflows of a plurality of automated detection decisioning workflows digitally mapped to the technology source-agnostic event signal based on a signal type of the technology source-agnostic event signal (e.g., if technology source-agnostic event signal is of an AWS CloudTrail signal type, obtain all automated detection decisioning workflows digitally mapped to the AWS CloudTrail signal type, if the technology source-agnostic event signal is of a technology source-agnostic file event signal type, obtain all automated detection decisioning workflows digitally mapped to the technology source-agnostic file event signal type). Accordingly, in such embodiments, the system or service implementing method 200 may function to evaluate, via the one or more computers, the technology source-agnostic event signal against the selective subset of automated detection decisioning workflows, as described in U.S. Patent Application No. 63/533,238, filed 17 Aug. 2023, titled SYSTEMS, METHODS, AND GRAPHICAL USER INTERFACES FOR CONFIGURING AND IMPLEMENTING COMPUTER-EXECUTABLE DETECTION INSTRUCTIONS IN A CYBERSECURITY THREAT DETECTION AND MITIGATION PLATFORM, which is incorporated herein in its entirety by this reference.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:
    displaying, via a data integration building user interface, a plurality of integration-identifying user interface input elements configured to receive one or more strings of text for specifying a set of integration identification parameters that characterize an in-development security integration for a third-party security service;
    displaying, via the data integration building user interface, a signal-specific data mapping container based on receiving an input selecting a signal mapping addition control button of the data integration building user interface, wherein the signal-specific data mapping container is configured to receive inputs of characters to map technology-specific data attributes of the third-party security service to technology source-agnostic data attributes required by a target technology source-agnostic event signal type;
    displaying, via the data integration building user interface, a raw event simulation container;
    automatically prepopulating, within the raw event simulation container, a distinct raw event generated by the third-party security service, wherein the raw event simulation container is configured to receive input of:
        an expected technology source-agnostic event signal type for validating that the in-development security integration accurately translates the distinct raw event automatically prepopulated within the raw event simulation container to a technology source-agnostic event signal of the expected technology source-agnostic event signal type using mapping instructions specified by the signal-specific data mapping container, wherein:
            the raw event simulation container executes, via one or more processing devices, a computer-based integration simulation that generates a simulation output indicating whether a reconfiguration of the in-development security integration is needed before the in-development security integration is deployed into production by assessing whether the mapping instructions specified by the signal-specific data mapping container translated the distinct raw event to a technology-source agnostic security event signal of the expected technology source-agnostic event signal type, and
            the computer-based integration simulation is automatically executed based on detecting an algorithmic change to the in-development security integration; and
    displaying, via the data integration building user interface, an integration deployment control element that, when operated, transitions the in-development security integration to a deployed security integration for the third-party security service, wherein based on operating the integration deployment control element, installing the mapping instructions configured via the signal-specific data mapping container into a computer database storing a plurality of previously deployed security integrations;
    receiving an unnormalized security event from the third-party security service;
    generating a technology-source agnostic security event signal that corresponds to the unnormalized security event using the deployed security integration for the third-party security service; and
    executing, in real-time, a threat mitigation response that mitigates a security threat associated with the technology-source agnostic security event signal that corresponds to the unnormalized security event by reporting the security threat in real-time to a threat reporting user interface accessible to a subscribing entity.

2. The computer-implemented method according to claim 1, further comprising:
    at a cybersecurity event detection and response service:
        identifying that the third-party security service is in inoperable communication with the cybersecurity event detection and response service; and
        instantiating, via one or more computers, the data integration building user interface based on identifying that the third-party security service is in inoperable communication with the cybersecurity event detection and response service, wherein the data integration building user interface is digitally accessible by a user of the cybersecurity event detection and response service.

3. The computer-implemented method according to claim 1, further comprising:
    receiving, via one or more computers, a third-party event;
    identifying, within the computer database storing the plurality of previously deployed security integrations, a target security data integration of the plurality of previously deployed security integrations that corresponds to the third-party event based on a type of the third-party event; and generating a corresponding technology source-agnostic event signal using mapping instructions defined by the target security data integration that corresponds to the third-party event.

4. The computer-implemented method according to claim 3, wherein:

in response to generating the corresponding technology source-agnostic event signal:

identifying, via the one or more computers, a selective subset of automated detection decisioning workflows of a plurality automated detection decisioning workflows digitally mapped to the corresponding technology source-agnostic event signal based on a signal type of the corresponding technology source-agnostic event signal;

evaluating, via the one or more computers, the corresponding technology source-agnostic event signal against the selective subset of automated detection decisioning workflows.

5. The computer-implemented method according to claim 1, wherein:

the plurality of integration-identifying user interface input elements includes:

a first integration-identifying user interface input element configured to receive an input of a title that corresponds to the in-development security integration, a second integration-identifying user interface input element configured to receive an input of an integration description that corresponds to the in-development security integration, and a third integration-identifying user interface input element configured to receive an input of a slug that corresponds to the in-development security integration.

6. The computer-implemented method according to claim 1, wherein:

the signal-specific data mapping container includes a signal type user interface element that, when selected, displays a drop-down menu element of a plurality of technology source-agnostic event signal types provided by a cybersecurity event detection and response service.

7. The computer-implemented method according to claim 6, further comprising:

dynamically instantiating, within the signal-specific data mapping container, a plurality of source-to-target data mapping user interface elements based on receiving a selection of the target technology source-agnostic event signal type from the drop-down menu element of the plurality of technology source-agnostic event signal types.

8. The computer-implemented method according to claim 6, wherein:

the target technology source-agnostic event signal type is associated with a plurality of signal versions, wherein each signal version of the plurality of signal versions corresponds to a distinct iteration of the target technology source-agnostic event signal type, the signal-specific data mapping container further includes a version-controlled user interface element that, when selected, displays a drop-down menu element of the plurality of signal versions that correspond to the target technology source-agnostic event signal type.

9. The computer-implemented method according to claim 8, further comprising:

dynamically instantiating, within the signal-specific data mapping container, a plurality of source-to-target data mapping user interface elements based on:

(a) receiving a selection of the target technology source-agnostic event signal type from the drop-down menu element of the plurality of technology source-agnostic event signal types, and (b) receiving a selection of a target signal version of the target technology source-agnostic event signal type from the drop-down menu element of the plurality of signal versions.

10. The computer-implemented method according to claim 1, further comprising:

determining a threat severity of the technology-source agnostic security event signal that corresponds to the unnormalized security event based on assessing the technology-source agnostic security event signal that corresponds to the unnormalized security event against a set of automated detection decisioning workflows digitally mapped to a type of the technology-source agnostic security event signal; and routing the technology-source agnostic security event signal that corresponds to the unnormalized security event to one of a plurality of event queues, wherein:

the technology-source agnostic security event signal that corresponds to the unnormalized security event is routed to an event escalation queue when the technology-source agnostic security event signal that corresponds to the unnormalized security event satisfies escalation criteria of the set of automated detection decisioning workflows decisioning workflows, and the technology-source agnostic security event signal that corresponds to the unnormalized security event is routed to an event disposal queue when the technology-source agnostic security event signal that corresponds to the unnormalized security event satisfies disposal criteria of the set of automated detection decisioning workflows.

11. A non-transitory machine-readable storage medium storing computer instructions that, when executed by one or more processors, perform operations comprising:

displaying, via a data integration building user interface, a plurality of integration-identifying user interface input elements configured to receive one or more strings of text for specifying a set of integration identification parameters that characterize an in-development security integration for a third-party security service;

displaying, via the data integration building user interface, a signal-specific data mapping container based on receiving an input selecting a signal mapping addition control button of the data integration building user interface, wherein the signal-specific data mapping container is configured to receive inputs of characters to map technology-specific data attributes of the third-party security service to technology source-agnostic data attributes required by a target technology source-agnostic event signal type;

displaying, via the data integration building user interface, a raw event simulation container;

automatically prepopulating, within the raw event simulation container, a distinct raw event generated by the third-party security service, wherein the raw event simulation container is configured to receive input of:
an expected technology source-agnostic event signal type for validating that the in-development security integration accurately translates the distinct raw event automatically prepopulated within the raw event simulation container to a technology source-agnostic event signal of the expected technology source-agnostic event signal type using mapping instructions specified by the signal-specific data mapping container, wherein:
the raw event simulation container executes, via one or more processing devices, a computer-based integration simulation that generates a simulation output indicating whether a reconfiguration of the in-development security integration is needed before the in-development security integration is deployed into production by assessing whether the mapping instructions specified by the signal-specific data mapping container translated the distinct raw event to a technology-source agnostic security event signal of the expected technology source-agnostic event signal type, and
the computer-based integration simulation is automatically executed based on detecting an algorithmic change to the in-development security integration; and
displaying, via the data integration building user interface, an integration deployment control element that, when operated, transitions the in-development security integration to a deployed security integration for the third-party security service, wherein based on operating the integration deployment control element, installing the mapping instructions configured via the signal-specific data mapping container into a computer database storing a plurality of previously deployed security integrations;
receiving an unnormalized security event from the third-party security service;
generating a technology-source agnostic security event signal that corresponds to the unnormalized security event using the deployed security integration for the third-party security service; and
executing, in real-time, a threat mitigation response that mitigates a security threat associated with the technology-source agnostic security event signal that corresponds to the unnormalized security event by reporting the security threat in real-time to a threat reporting user interface accessible to a subscribing entity.

12. The non-transitory machine-readable storage medium according to claim 11, wherein the computer instructions, when executed by the one or more processors, perform operations further comprising:
at a cybersecurity event detection and response service:
identifying that the third-party security service is in inoperable communication with the cybersecurity event detection and response service; and
instantiating, via one or more computers, the data integration building user interface based on identifying that the third-party security service is in inoperable communication with the cybersecurity event detection and response service, wherein the data integration building user interface is digitally accessible by a user of the cybersecurity event detection and response service.

13. The non-transitory machine-readable storage medium according to claim 11, wherein the computer instructions, when executed by the one or more processors, perform operations further comprising:
receiving, via one or more computers, a third-party event;
identifying, within the computer database storing the plurality of previously deployed security integrations, a target security data integration of the plurality of previously deployed security integrations that corresponds to the third-party event based on a type of the third-party event; and
generating a corresponding technology source-agnostic event signal using mapping instructions defined by the target security data integration that corresponds to the third-party event.

14. The non-transitory machine-readable storage medium according to claim 11, wherein:
the plurality of integration-identifying user interface input elements includes:
a first integration-identifying user interface input element configured to receive an input of a title that corresponds to the in-development security integration,
a second integration-identifying user interface input element configured to receive an input of an integration description that corresponds to the in-development security integration, and
a third integration-identifying user interface input element configured to receive an input of a slug that corresponds to the in-development security integration.

15. The non-transitory machine-readable storage medium according to claim 11, wherein:
the signal-specific data mapping container includes a signal type user interface element that, when selected, displays a drop-down menu element of a plurality of technology source-agnostic event signal types provided by a cybersecurity event detection and response service.

16. The non-transitory machine-readable storage medium according to claim 11, wherein the computer instructions, when executed by the one or more processors, perform operations further comprising:
determining a threat severity of the technology-source agnostic security event signal that corresponds to the unnormalized security event based on assessing the technology-source agnostic security event signal that corresponds to the unnormalized security event against a set of automated detection decisioning workflows digitally mapped to a type of the technology-source agnostic security event signal; and
routing the technology-source agnostic security event signal that corresponds to the unnormalized security event to one of a plurality of event queues, wherein:
the technology-source agnostic security event signal that corresponds to the unnormalized security event is routed to an event escalation queue when the technology-source agnostic security event signal that corresponds to the unnormalized security event satisfies escalation criteria of the set of automated detection decisioning workflows decisioning workflows, and the technology-source agnostic security event signal that corresponds to the unnormalized security event is routed to an event disposal queue when the technology-source agnostic security event signal that corresponds to the unnormalized security event satisfies disposal criteria of the set of automated detection decisioning workflows.

* * * * *